(12) United States Patent
Takasaki et al.

(10) Patent No.: US 10,347,883 B2
(45) Date of Patent: Jul. 9, 2019

(54) BATTERY-AFFIXING FRAME MEMBER, BATTERY-AFFIXING MEMBER, AND ELECTRICITY STORAGE DEVICE

(71) Applicant: Panasonic Intellectual Property Management Co., Ltd., Osaka-shi, Osaka (JP)

(72) Inventors: Hiroshi Takasaki, Osaka (JP); Tomoaki Aoki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 524 days.

(21) Appl. No.: 14/916,088

(22) PCT Filed: Sep. 26, 2014

(86) PCT No.: PCT/JP2014/004932
§ 371 (c)(1),
(2) Date: Mar. 2, 2016

(87) PCT Pub. No.: WO2015/045401
PCT Pub. Date: Apr. 2, 2015

(65) Prior Publication Data
US 2016/0218333 A1    Jul. 28, 2016

(30) Foreign Application Priority Data

Sep. 30, 2013  (JP) ................................. 2013-203669
Jan. 31, 2014  (JP) ................................. 2014-017568

(51) Int. Cl.
H01M 2/10      (2006.01)
H01M 2/12      (2006.01)

(52) U.S. Cl.
CPC ........... H01M 2/1077 (2013.01); H01M 2/12 (2013.01); H01M 2/1252 (2013.01)

(58) Field of Classification Search
None
See application file for complete search history.

(56) References Cited

U.S. PATENT DOCUMENTS

2002/0192543 A1   12/2002  Heimer
2005/0242774 A1*  11/2005  Marraffa ............. H01M 2/1077
                                                          320/116
(Continued)

FOREIGN PATENT DOCUMENTS

JP    2009154826 A    7/2009
JP    2011204577 A   10/2011
(Continued)

OTHER PUBLICATIONS

International Preliminary Report on Patentability and Written Opinion of the International Searching Authority corresponding to Application No. PCT/JP2014/004932; dated Apr. 5, 2016 with English translation.

(Continued)

Primary Examiner — Ula C Ruddock
Assistant Examiner — Tony S Chuo
(74) Attorney, Agent, or Firm — Cantor Colburn LLP

(57) ABSTRACT

A battery-affixing frame member includes a body plate section and duct-forming members. The duct-forming members are affixed to one surface side of the body plate section and are combined with the body plate section to form gas discharge ducts. The gas discharge ducts are used to discharge gas discharged from the inside of battery modules. The battery-affixing frame member is used to form a battery-affixing member for integrally affixing the battery modules together, the battery modules being arranged on the other surface side of the body plate section.

6 Claims, 21 Drawing Sheets

(56) References Cited

U.S. PATENT DOCUMENTS

| | | | | |
|---|---|---|---|---|
| 2012/0288738 A1* | 11/2012 | Yasui | ............... | H01M 2/1022 |
| | | | | 429/82 |
| 2013/0017428 A1 | 1/2013 | Han et al. | | |
| 2013/0040174 A1* | 2/2013 | Takasaki | ............ | H01M 2/1077 |
| | | | | 429/82 |

FOREIGN PATENT DOCUMENTS

| | | | |
|---|---|---|---|
| JP | 2012074198 A | 4/2012 | |
| JP | 2013105723 A | 5/2013 | |
| JP | 2013105724 A | 5/2013 | |
| JP | 2013171746 A | 9/2013 | |
| JP | 2013196981 A | 9/2013 | |
| WO | 0030190 A1 | 5/2000 | |

OTHER PUBLICATIONS

Notification of Transmittal of the International Preliminary Report on Patentability and its translation corresponding to Application No. PCT/JP2014/004932; dated Apr. 14, 2016.
Second and Supplementary Notice Informing the Applicant of the Communication of the International Application corresponding to Application No. PCT/JP2014/004932; dated Feb. 4, 2016.
JP Notice of Grounds for Rejection corresponding to Application No. 2015-538912; dated Nov. 7, 2017.
International Search Report corresponding to Application No. PCT/JP2014/004932; dated Nov. 11, 2014.

* cited by examiner

BATTERY-AFFIXING FRAME MEMBER, BATTERY-AFFIXING MEMBER, AND ELECTRICITY STORAGE DEVICE

CROSS REFERENCE TO RELATED APPLICATIONS

This is the U.S. national stage of application No. PCT/JP2014/004932, filed on Sep. 26, 2014. Priority under 35 U.S.C. § 119(a) and 35 U.S.C. § 365(b) is claimed from Japanese Application No. 2013-203669, filed Sep. 30, 2013, and from Japanese Application No. 2014-017568, filed Jan. 31, 2014, the disclosures of which are also incorporated herein by reference.

TECHNICAL FIELD

The present invention relates to a battery fixation frame member used for forming a battery fixation member which integrally fixes a plurality of battery modules.

BACKGROUND ART

Patent Document 1 describes an electricity storage device having a battery module in which a plurality of battery cells are housed in a casing, and a holding member which holds the plurality of battery modules. Gas generated in the battery cell is exhausted from a lower part of the battery module, and from a gap between a plurality of panels forming the holding member, through an exhaust duct within the holding member.

RELATED ART REFERENCE

Patent Document

[Patent Document 1] JP 2013-105723 A

DISCLOSURE OF INVENTION

Technical Problem

In an electricity storage device including a plurality of battery modules, it is desired to reduce cost by employing a structure in which a plurality of exhaust ducts are provided for cooling to a safe temperature gas which is exhausted from the battery module. In order to realize such an electricity storage device, it is desired that a frame member forming a battery fixation member which fixes the plurality of battery modules include a structure with a plurality of duct structures, and, at the same time, reduce the cost.

Solution to Problem

According to one aspect of the present invention, there is provided a battery fixation frame member, comprising: a body plate portion, and a plurality of duct formation members, wherein the plurality of duct formation members are fixed on one surface side of the body plate portion and combined with the body plate portion to form a plurality of exhaust ducts, the plurality of exhaust ducts are used for exhausting gas exhausted from inside of a plurality of battery modules placed on the other surface side of the body plate portion, and the battery fixation frame member is used for forming a battery fixation member which integrally fixes the plurality of battery modules.

According to another aspect of the present invention, there is provided a battery fixation member comprising: the battery fixation frame member according to one aspect of the present invention; two side frames combined on both ends of the battery fixation frame member and in a manner to have different placement directions with respect to the battery fixation frame member; and a combination frame fixed in a manner to bridge over the two side frames.

According to another aspect of the present invention, there is provided an electricity storage device comprising: the battery fixation member according to one aspect of the present invention; and a plurality of battery modules fixed on the battery fixation member and each having an exhaust port, wherein each of the exhaust ducts is in communication with the exhaust port of at least one battery module of the plurality of the battery modules, and exhausts gas from the inside of the battery module.

Advantageous Effects of Invention

According to the battery fixation frame member, the battery fixation member, and the electricity storage device of various aspects of the present invention, a frame member forming a battery fixation member includes a plurality of duct structures and the cost can be reduced.

EMBODIMENT

A preferred embodiment of the present invention will now be described in detail with reference to the drawings. In this description, specific shapes, materials, numerical values, directions, or the like are merely exemplary for facilitating understanding of the present invention, and can be suitably changed according to the usage, objective, specification, or the like. In addition, when the following description includes a plurality of embodiments or alternative configurations, the constituting elements in the plurality of embodiments or alternative configurations may be suitably and arbitrarily combined for practice of the present invention. In the following, elements substantially identical among all drawings are not necessarily described multiple times.

Figure 1:
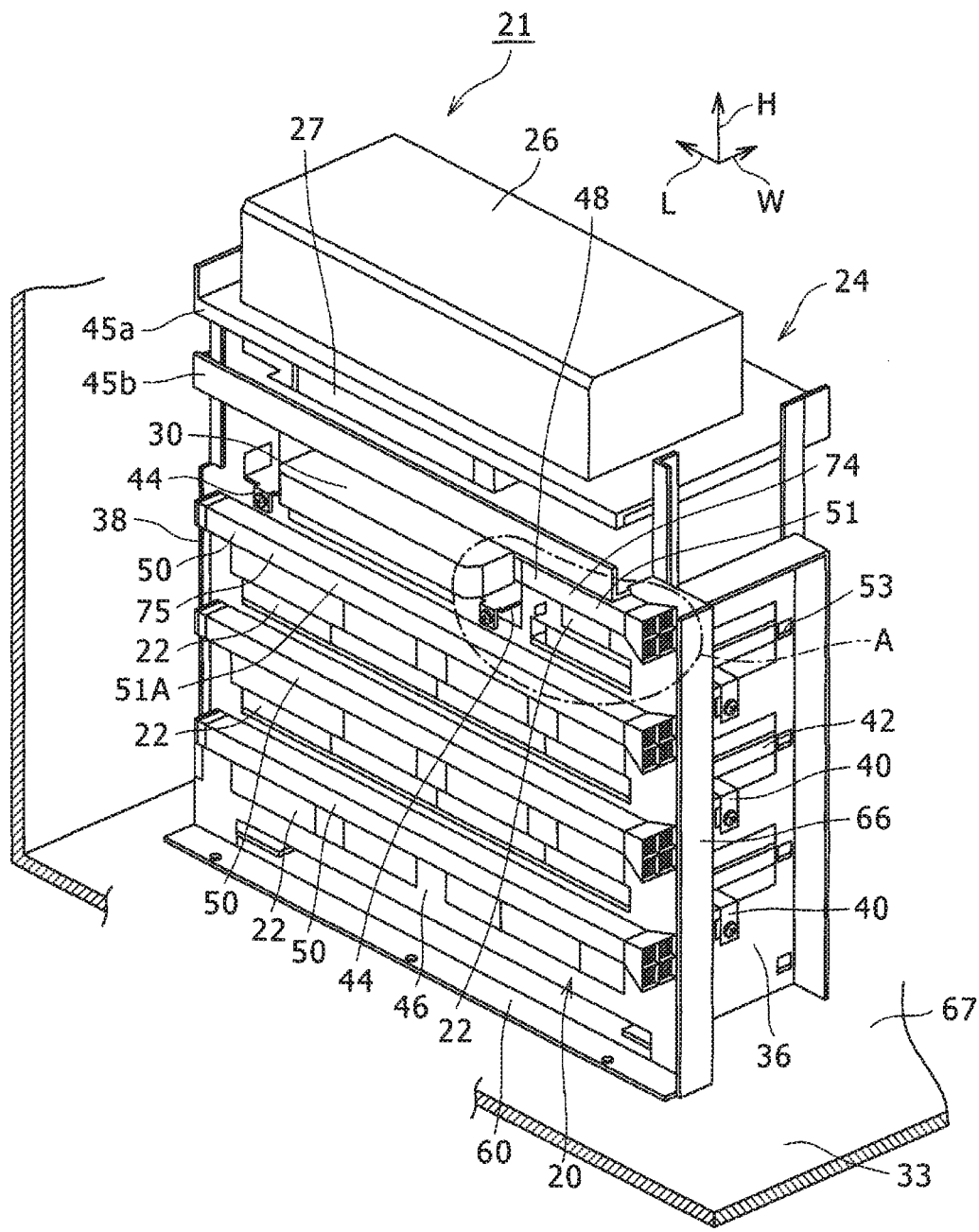
FIG. 1 is a perspective view showing an electricity storage device including a duct frame which is a battery fixation frame member according to a preferred embodiment of the present invention.
Figure 2:
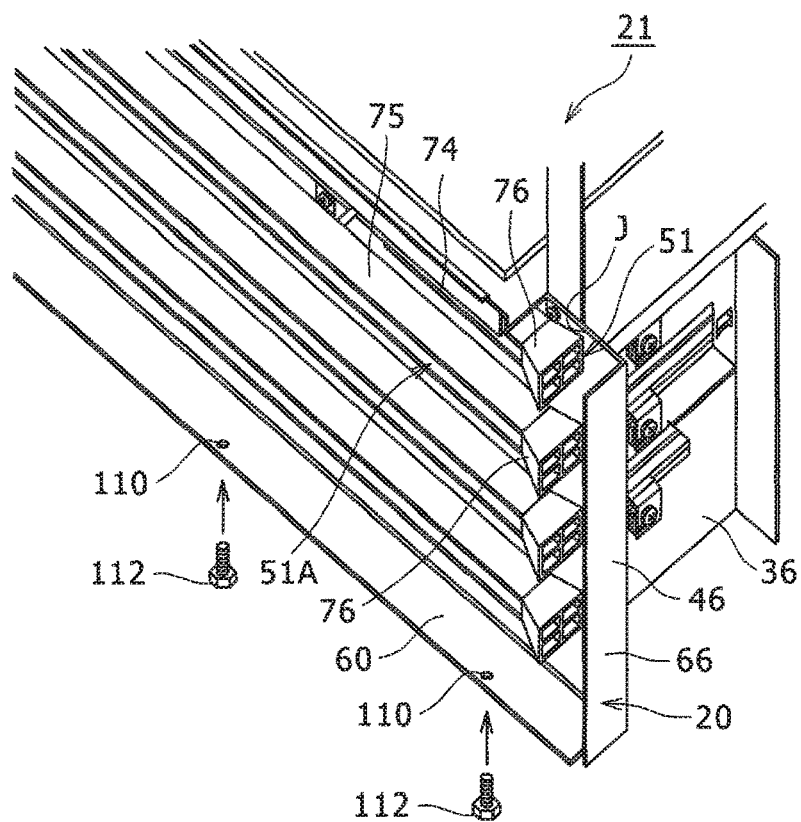
FIG. 2 is a perspective view enlarging a part of FIG. 1 showing a device according to a preferred embodiment of the present invention.
Figure 3:
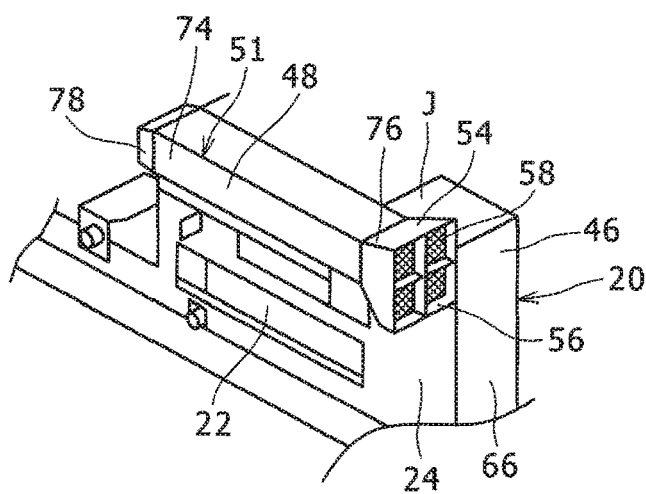
FIG. 3 is an A-part enlargement diagram of FIG. 1 showing a device according to a preferred embodiment of the present invention.
Figure 4:
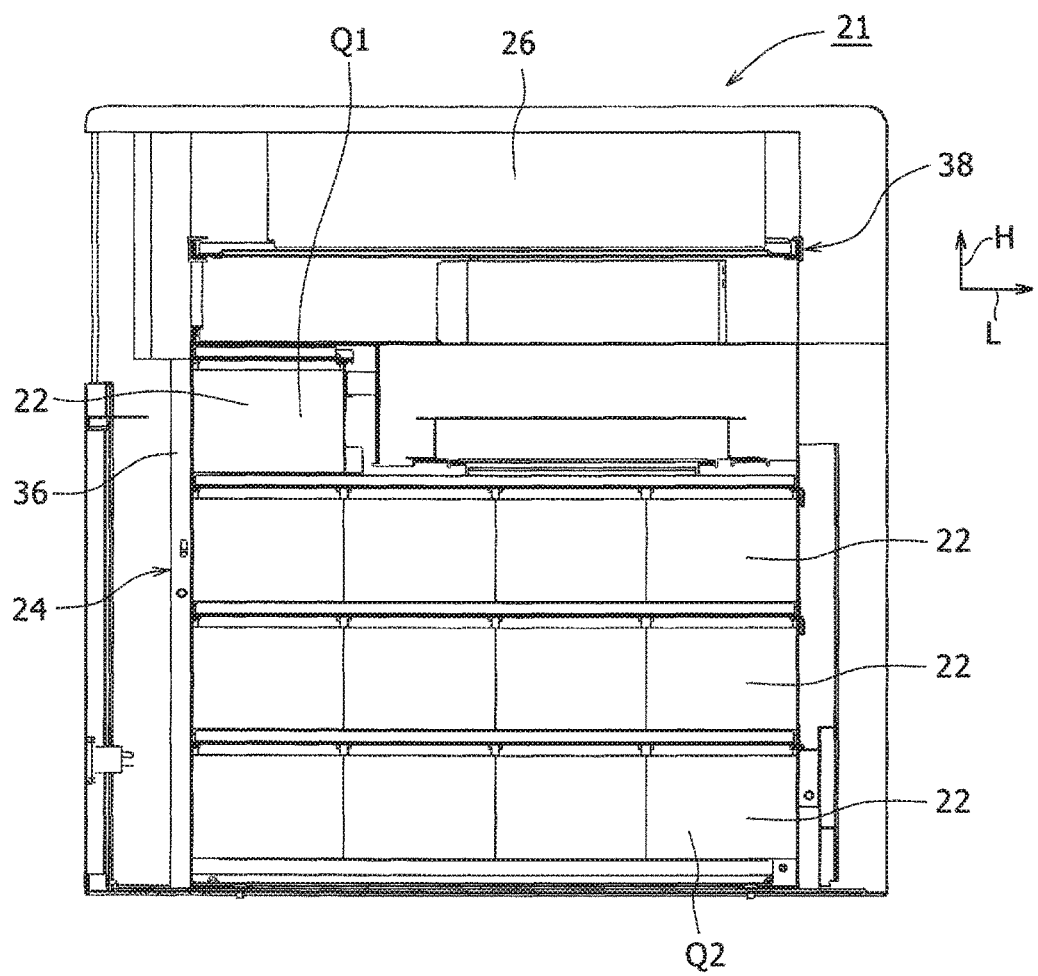
FIG. 4 is a diagram of an electricity storage device including a duct frame according to a preferred embodiment of the present invention, omitting a part of the device and viewed from a back side.

FIG. 1 is a perspective view showing an electricity storage device 21 including a duct frame 20 which is a battery fixation frame member in a preferred embodiment of the present invention. FIG. 2 is a perspective view enlarging a part of FIG. 1 showing the device of the preferred embodiment of the present invention. FIG. 3 is an A-part enlarged diagram of FIG. 1 showing the device of the preferred embodiment of the present invention. FIG. 4 is a diagram showing the electricity storage device 21 including a duct frame according to the preferred embodiment of the present invention, omitting a part of the device, and viewed from a back side. The electricity storage device 21 includes a plurality of battery modules 22 shown in FIG. 4, a fixation member with a duct which is a battery fixation member which integrally fixes the plurality of battery modules 22, an inverter 26, a converter 27, and a circuit board 30, and is housed in a casing 33. In FIG. 1, the device is shown in a state where the casing 33 is disassembled. FIG. 2 is shown with the casing 33 omitted.

The electricity storage device 21 has functions to charge electric power obtained by a power generation device such as a solar cell (not shown) into the battery module 22, to boost or reduce by the converter 27 the voltage of a DC power extracted from the battery module 22 as necessary, to convert the DC power into AC power by the inverter 26, and to output the converted power to electronic devices (not shown). The circuit board 30 includes a controller which controls operations of the inverter 26 and the converter 27. The electricity storage device 21 is fixed at the inside of a casing (not shown). The electricity storage device 21 is not limited to a structure used for storing or supplying electric power from the power generation device, and may be used, for example, during power outage or for adjustment of electric power consumption. For example, the electricity storage device 21 may store electric power supplied from a commercial AC power supply to the electricity storage device 21 in a time period in which the electric power consumption is low over an entire building in which the electric power is distributed, and to supply electric power from the electricity storage device 21 to the electronic devices in the building in which the electricity storage device 21 is provided during a time period in which the electric power consumption is high or during a power outage. In this case, the inverter 26 converts the supplied AC electric power to the DC electric power, and the converted DC electric power is stored in the battery module 22.

In a part of FIGS. 1, 4, and subsequent drawings, as three axial directions orthogonal to each other, a height direction H, a length direction L, and a width direction W are shown. The height direction H is an up-and-down direction or a vertical direction when the electricity storage device 21 is placed on a horizontal surface. The length direction L and the width direction W are directions orthogonal to each other on the horizontal surface. Here, a direction in which the electricity storage device 21 has a longer size is set as the length direction L, and a direction with a shorter size of the electricity storage device 21 is set as the width direction W.

Figure 5:
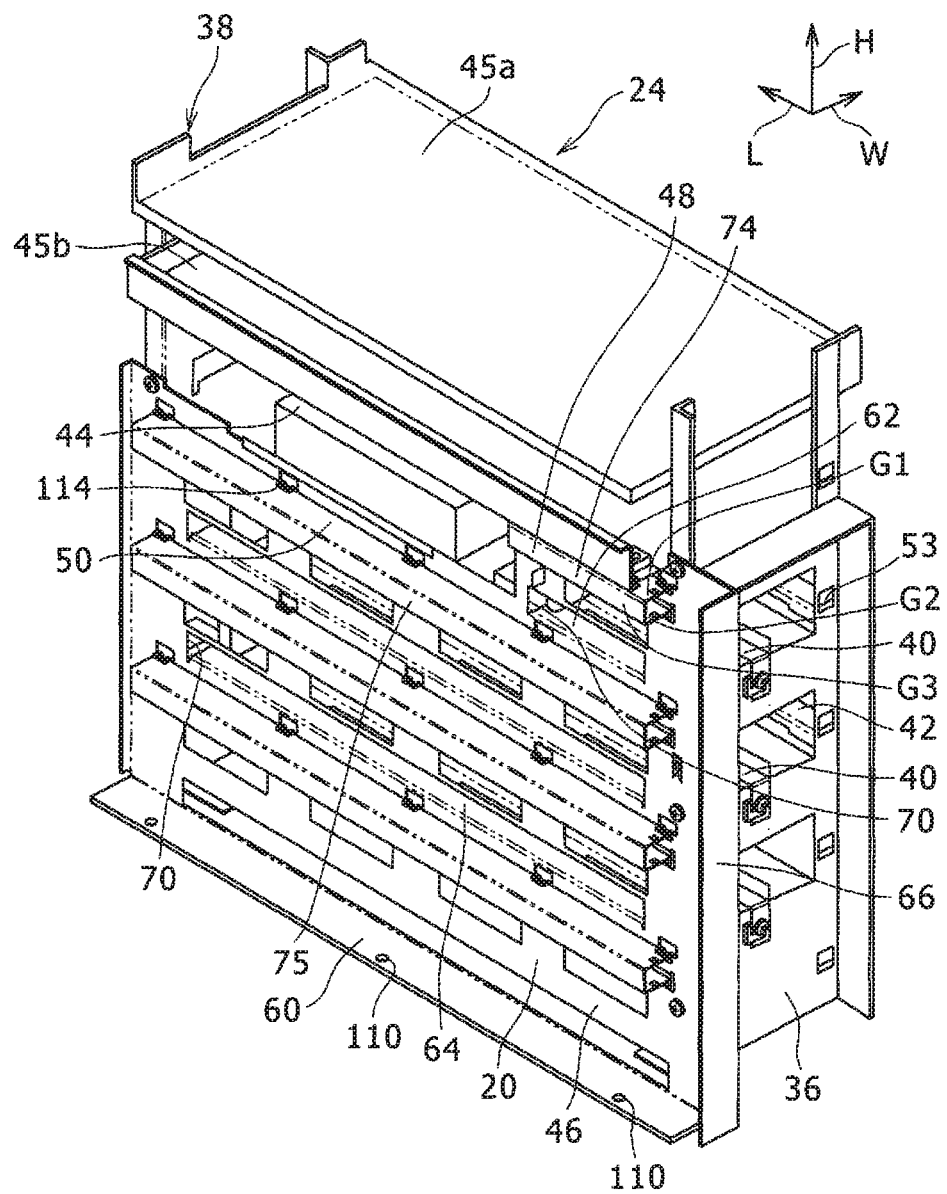
FIG. 5 is a perspective view showing a fixation member with a duct which is a battery fixation member in an electricity storage device including a duct frame in a preferred embodiment of the present invention, omitting a part of the device.
Figure 6:
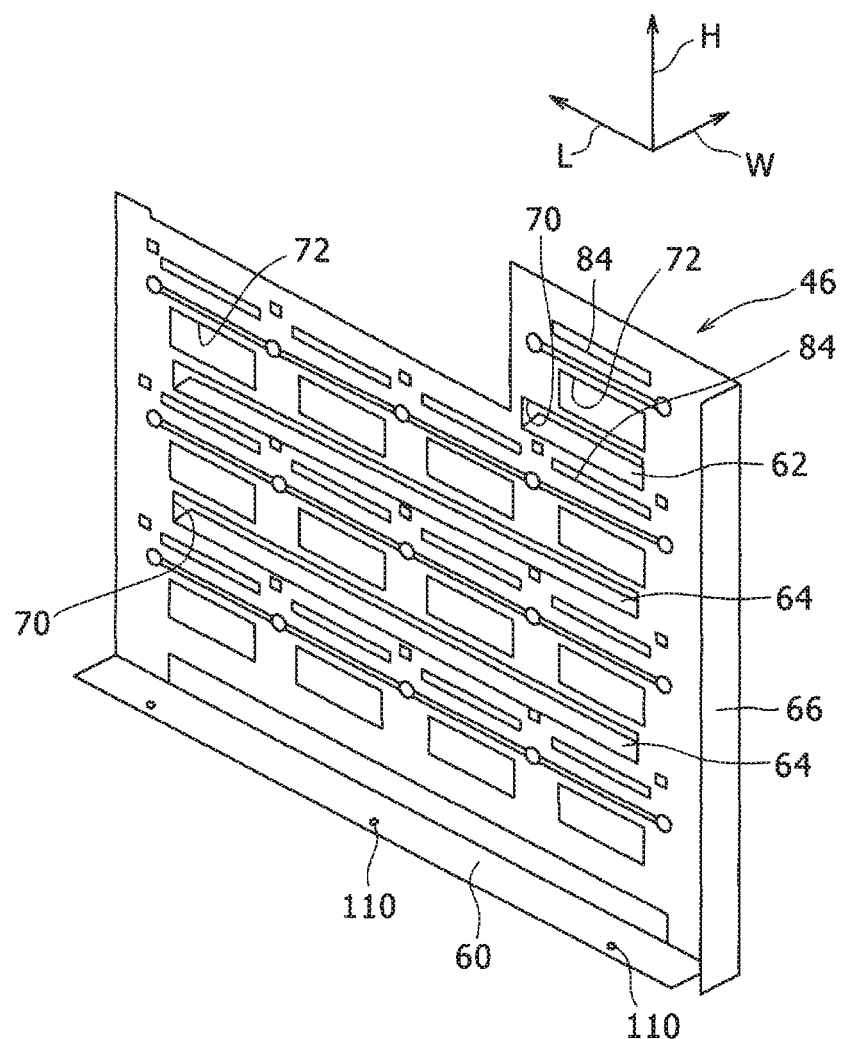
FIG. 6 is a schematic perspective view showing a frame body which is a body plate portion of an electricity storage device including a duct frame in a preferred embodiment of the present invention.
Figure 7:
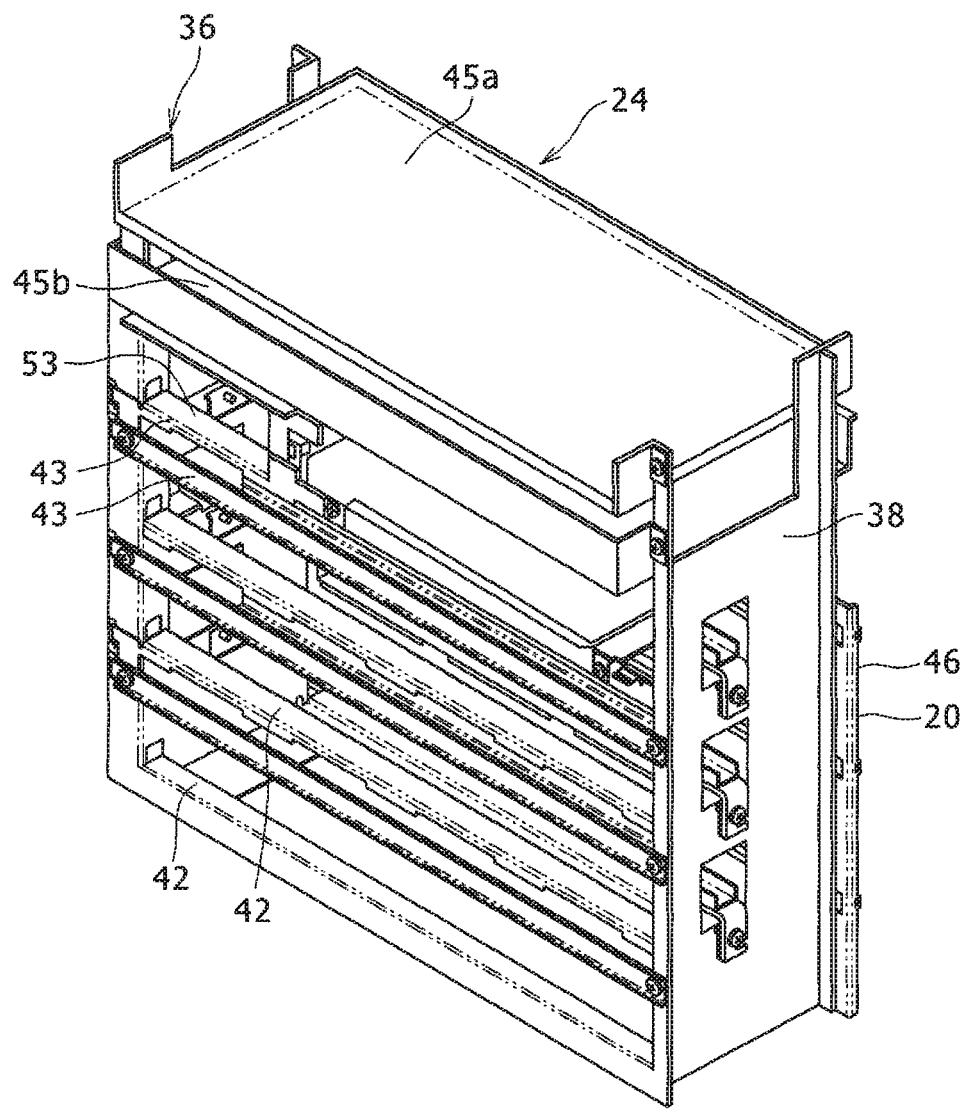
FIG. 7 is a perspective view of the fixation member with the duct of FIG. 5 in a preferred embodiment of the present invention, viewed from the back side.
Figure 8:
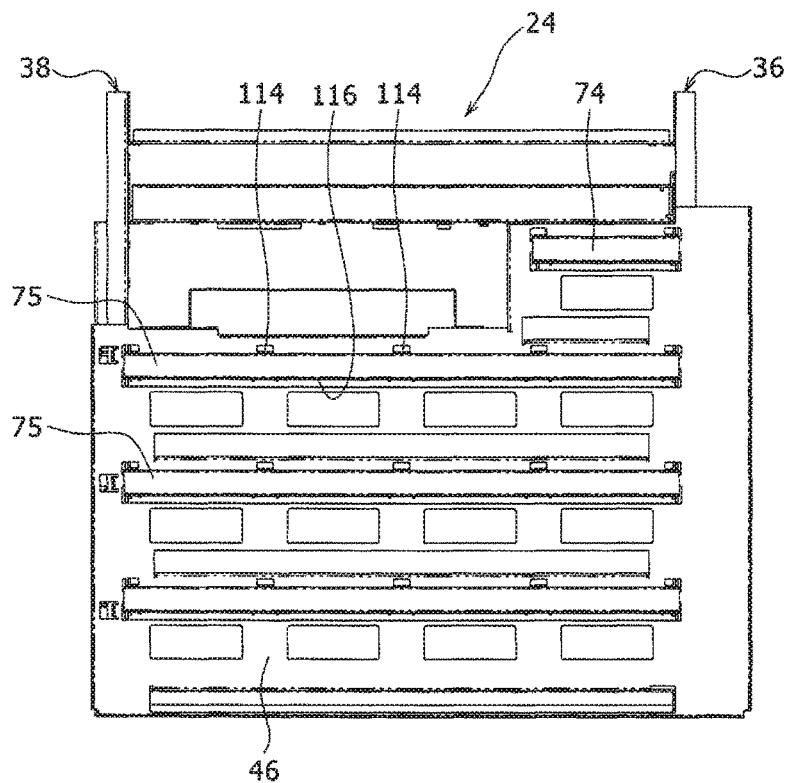
FIG. 8 is a front view of a fixation member with a duct in a preferred embodiment of the present invention.
Figure 9:
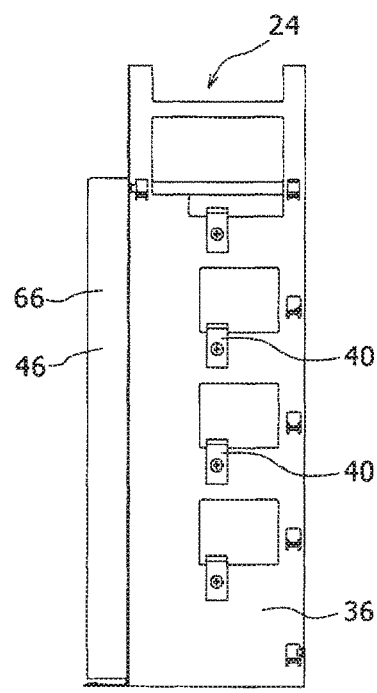
FIG. 9 is aright side view of FIG. 8 showing a fixation member with a duct in a preferred embodiment of the present invention.
Figure 10:
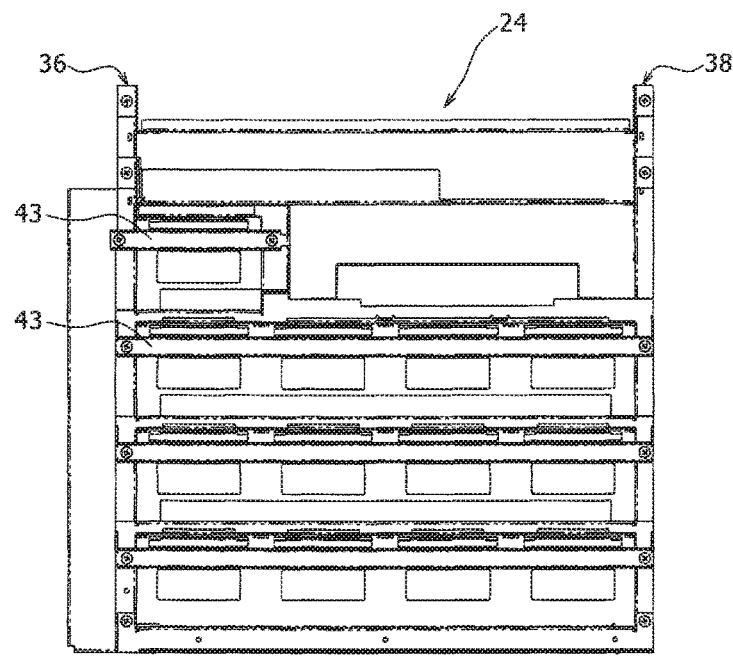
FIG. 10 is a back view of a fixation member with a duct in a preferred embodiment of the present invention.
Figure 11:
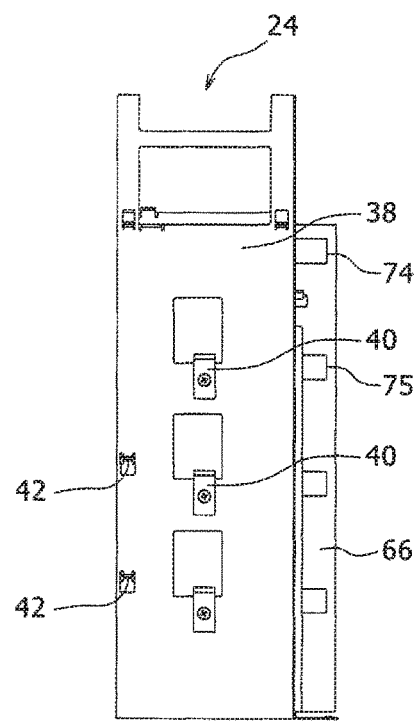
FIG. 11 is a left side view of FIG. 8 showing a fixation member with a duct in a preferred embodiment of the present invention.

Next, the fixation member 24 with the duct will be described. FIG. 5 is a perspective view omitting a duct exit member and a lid member from the electricity storage device 21 including the duct frame according to the preferred embodiment of the present invention, and showing the fixation member 24 with the duct. FIG. 6 is a schematic perspective view showing a frame body 46 of FIG. 1 showing a device including a duct frame in the preferred embodiment of the present invention. FIG. 7 is a perspective view of the fixation member 24 with the duct of FIG. 5 in the preferred embodiment of the present invention, viewed from a back side. FIGS. 8, 9, 10, and 11 are respectively a front view, a right side view of FIG. 8, a back view, and a left side view of FIG. 8 of the fixation member 24 with the duct in the preferred embodiment of the present invention.

The fixation member 24 with the duct includes a duct frame 20, two side frames 36 and 38, a plurality of combination frames 40, 42, 43, and 53, a board support frame 44, a first lateral plate 45a, and a second lateral plate 45b, and is integrally fixed. The two side frames 36 and 38 are a first side frame 36 and a second side frame 38. The plurality of combination frames 40, 42, 43, and 53 are a first combination frame 40, a second combination frame 42, a third combination frame 43, and a fourth combination frame 53.

The duct frame 20 has the frame body 46 which is a body plate portion 46, and a plurality of duct formation members 48 and 50. The duct frame 20 is formed by combining and fixing the plurality of duct formation members 48 and 50 arranged in the up-and-down direction and on a one surface side (a front surface side of FIG. 5) of the frame body 46. The plurality of duct formation members 48 and 50 are a first duct formation member 48 and a second duct formation member 50. The duct frame 20 is used to form the fixation member 24 with the duct which integrally fixes the plurality of battery modules 22 (FIG. 4) placed on the other surface side (a back surface side of FIG. 5) of the frame body 46.

The frame body 46 is formed by applying bend machining and hole machining on a plate-shaped member having a predetermined outer shape. As shown in FIG. 5, the first duct formation member 48 and the second duct formation member 50 include a first plate portion G1 and a second plate portion G2 which are two upper and lower plate portions along the horizontal direction, and an outer plate portion G3 connected to the plate portions G1 and G2 and extending along the vertical direction. The first duct formation member 48 is formed from a first duct body 74 which is opened on the side of the frame body 46, and a duct exit member 76 and a lid member 78 (FIGS. 2 and 3) combined with both ends of the first duct body 74. The second duct formation member 50 is formed from a second duct body 75 which is opened on the side of the frame body 46, and the duct exit member 76 and the lid member 78 combined to both ends of the second duct body 75. The duct bodies 74 and 75 are combined in a manner such that the open ends are blocked by the plate portions of the frame body 46 and a straight line gas flow path having a rectangular cross section is formed. With such a configuration, a first exhaust duct 51 and a plurality of second exhaust ducts 51A (FIGS. 2 and 3) which are a plurality of exhaust ducts arranged in the up-and-down direction are formed. Therefore, the first duct formation member 48 and the plurality of the second duct formation members 50 form the first exhaust duct 51 and the plurality of second exhaust ducts 51A by being combined with the frame body 46. The exhaust ducts 51 and 51A are used for exhausting gas exhausted from inside of the battery module 22 to the outside.

The frame body 46, the duct bodies 74 and 75, the side frames 36 and 38, the combination frames 40, 42, 43, and 53, the board support frame 44, and lateral plates 45a and 45b may be formed from a metal plate such as iron, aluminum, or the like.

In the example configuration of FIG. 5, the third plate portion protruding at a right angle to and facing the plate portions G1 and G2 is formed by bending formation on the open ends of the first plate portion G1 and the second plate portion G2 forming the duct bodies 74 and 75, respectively, and the third plate portion is contacted on one side surface of the frame body 46. In addition, in the frame body 46, a plurality of frame holes are formed on both sides in the up-and-down direction of the duct bodies 74 and 75. With a first protrusion 114 and a second protrusion 116 (FIG. 8) obtained by bend forming an inner portion of the frame hole toward the side of the duct bodies 74 and 75, the duct formation members 48 and 50 are sandwiched from both sides in the up-and-down direction and fixed on the frame body 46. The combining structure of the duct formation members 48 and 50 and the frame body 46 is not limited to such a structure, and may be constructed using, for example, a combining means such as a bolt, a junction such as welded section, or the like.

As shown in FIG. 3, the first exhaust duct 51 at the uppermost level is connected to the battery module 22 at the uppermost level, and the first exhaust duct 51 is in communication with an exhaust port 52 (FIG. 12) provided on the battery module 22. In the first exhaust duct 51, there is provided a cross-section enlarging section 54 in which a cross sectional area of the flow path is enlarged from an end on the gas downstream side toward the gas downstream side. A temperature reduction member 58 is fixed at a periphery of a duct exit 56 of the cross-section enlarging section 54, to reduce the temperature of the gas passing through a gap of the temperature reduction member 58. The second exhaust ducts 51A other than that on the uppermost level are similarly connected to the battery module 22 of the respective level. The cross-section enlarging section 54 of each of the exhaust ducts 51 and 51A will be described later in detail.

The first side frame 36 and the second side frame 38 are combined on both ends of the frame body 46 in a manner such that the placement direction differs from the placement direction of the frame body 46. Specifically, the side frames 36 and 38 are fixed at right angles with respect to the frame body 46 by screwing on both ends of the frame body 46 in the length direction L, to form a gate shape when viewed from above. The first combination frame 40, the second combination frame 42, the third combination frame 43, and the fourth combination frame 53 are placed in a manner to bridge over the length direction on a plurality of locations of the first side frame 36 and the second side frame 38, and combined and fixed thereto. The board support frame 44 is placed in a manner to bridge over the width direction on the fourth combination frame 53 and the frame body 46, and fixed thereto. The fourth combination frame 53 is fixed by screwing on one end (a back side end of FIG. 1) in the width direction of each of the side frames 36 and 38. The circuit board shown in FIG. 1 is fixed on the board support frame 44.

The first lateral plate 45a and the second lateral plate 45b are placed in such a manner as to bridge over the length direction on the upper ends of the first side frame 36 and the second side frame 38, arranged in the up-and-down direction, and both ends in the length direction of the lateral plates 45a and 45b are fixed by screwing on the side frames 36 and 38. The inverter 26 is fixed on the first lateral plate 45a at the upper side. The converter 27 is fixed on the second lateral plate 45b on the lower side.

At least one of the first combination frame 40 and the second combination frame 42 is formed in a bucket shape having a cross section of a U shape with a corner, by bending and elevating both ends of an intermediate portion along the length direction. Both ends in the length direction of at least one of the first combination frame 40 and the second combination frame 42 are screwed to the side frame 36 (or 38) or engaged with a peripheral section of a lateral hole formed in the side frame 36 (or 38) so as to be fixed thereto.

As shown in FIGS. 5 and 6, the frame body 46 is formed including a fall prevention plate 60 provided at a lower end, a first battery support plate 62 and a second battery support plate 64 which are a plurality of battery support plates, and an exhaust gas blocking plate 66 provided on one end in the length direction. The first battery support plate 62 and the second battery support plate 64 are formed in a protruding manner from a plurality of locations in the height direction H of the frame body 46 toward the other surface side (back side of FIG. 4). The fall prevention plate 60 is provided by bending and elevating the lower end of the frame body 46 in the horizontal direction.

The fall prevention plate 60 can be fixed by screwing on an upper side of a bottom plate portion 67 provided at a lower end of the casing 33 shown in FIG. 1. Specifically, screw insertion holes 110 are formed at a plurality of locations of the fall prevention plate 60. The fall prevention plate 60 is fixed on the bottom plate portion 67 (FIG. 1) of the casing 33 which is the member to be fixed which is placed at a lower side of the fall prevention plate 60, by combining a screw 112 inserted in the screw insertion hole 110 and a nut (not shown). The fall prevention plate 60 prevents fall of the frame body 46 to a left side of FIG. 5.

As will be described later, the battery modules 22 (FIG. 1) are placed on the upper side of the battery support plates 62 and 64. The exhaust gas blocking plate 66 is formed by bending and elevating on the side opposite from the battery module 22 over the entirety in the height direction H on one end of the length direction L of the frame body 46. The exhaust gas blocking plate 66 is provided to oppose one end (right end of FIG. 5) in the length direction L which is the gas downstream end of each of the duct bodies 74 and 75. Functions of the exhaust gas blocking plate 66 will be described later.

As shown in FIG. 4, on the fixation member 24 with the duct, the battery modules 22 are fixed by a combining means such as a bolt (not shown) in an arrangement of 4 levels in the up-and-down direction. Alternatively, the battery module 22 may be fixed on the fixation member 24 with the duct by being sandwiched between the combination frame 43 (FIG. 7) and the frame body 46, without the use of the bolt. Alternatively, the battery module 22 may be placed over the combination frame 40.

One battery module 22 is fixed on the uppermost level of the fixation member 24 with the duct, and four battery modules 22 are fixed on each of two middle levels and the lowermost level. A total of 13 battery modules 22 are placed in the electricity storage device 21. In FIG. 4, a terminal portion 68 (FIG. 13) of the battery module 22 to be described later is omitted.

Each battery module 22 is formed in a rectangular parallelepiped shape. The number of battery modules 22 in the electricity storage device 21 is not limited to 13, and may be suitably changed according to an output or a capacity desired for the electricity storage device 21.

Figure 12:
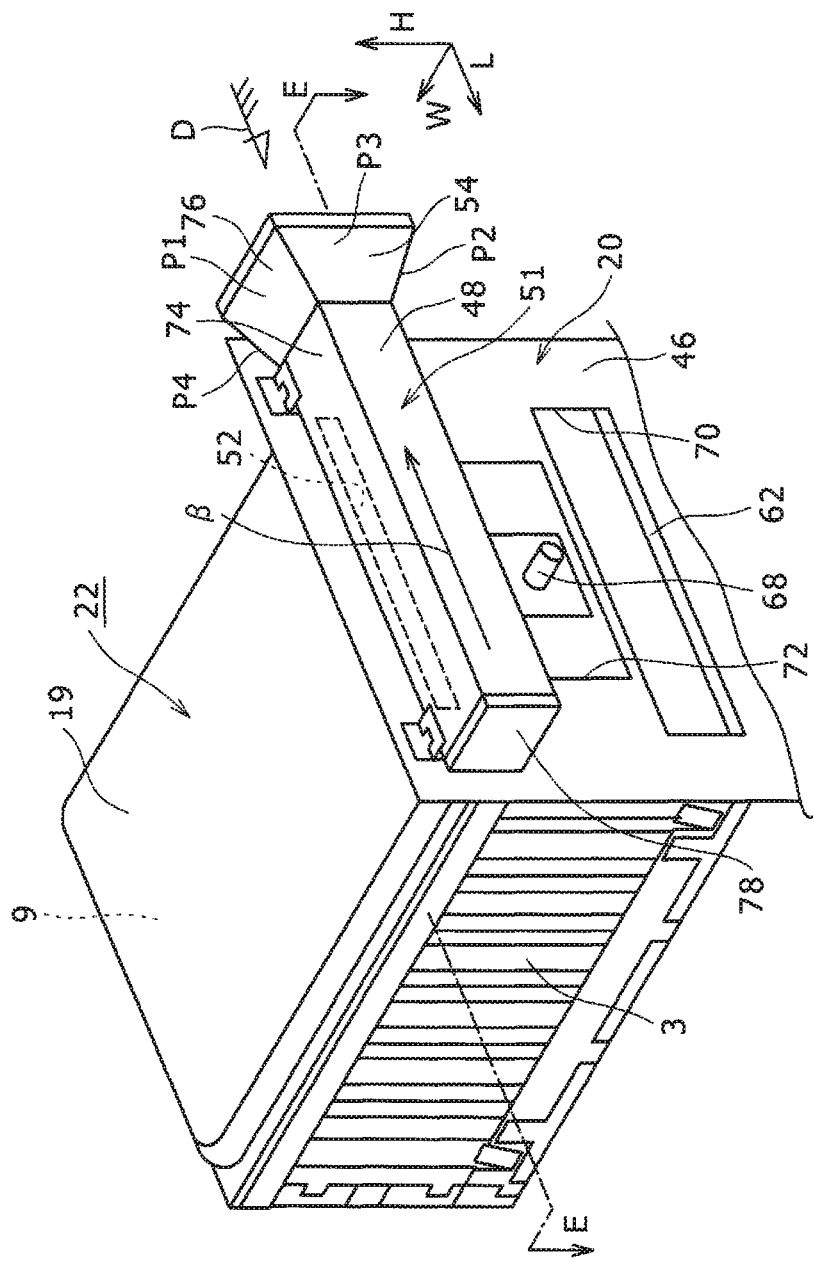
FIG. 12 is a perspective view enlarging a structure in which a battery module at an uppermost level and an exhaust duct are connected in a preferred embodiment of the present invention.
Figure 13:
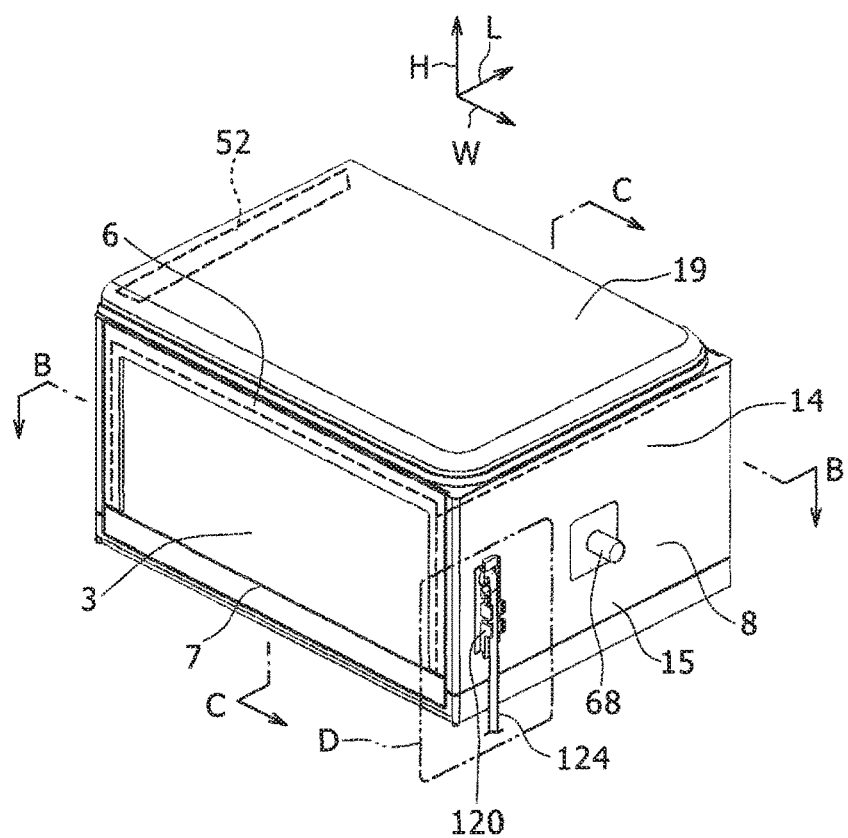
FIG. 13 is a perspective view of a battery module in an electricity storage device including a duct frame in a preferred embodiment of the present invention.
Figure 14:
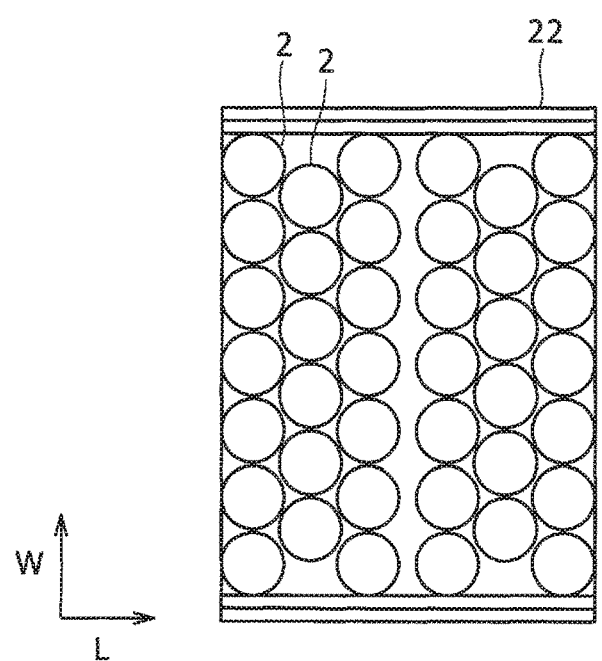
FIG. 14 is a B-B cross sectional diagram of FIG. 13 showing a device according to a preferred embodiment of the present invention.

FIG. 12 is a perspective view enlarging a structure in which the battery module 22 at the uppermost level and the exhaust duct 51 are connected in the preferred embodiment of the present invention. FIG. 13 is a perspective view showing the battery module 22 of the electricity storage device including the duct frame in the preferred embodiment of the present invention. FIG. 14 is a B-B cross sectional diagram of FIG. 13 showing the preferred embodiment of the present invention, and FIG. 15 is a C-C cross sectional diagram of FIG. 13 showing the preferred embodiment of the present invention.

When the battery module 22 is placed in the electricity storage device 21, the length direction of the battery module 22 coincides with the width direction W of the electricity storage device 21, and the width direction of the battery module 22 coincides with the length direction L of the electricity storage device 21. The terminal portions 68 are formed in a protruding manner on both ends in the length direction of the battery module 22. Of the two terminal portions 68, the terminal portion 68 on one side is a positive electrode terminal and the terminal portion 68 on the other side is a negative electrode terminal. The terminal portion 68 is electrically connected to an electrode of a battery cell of a minimum unit included in the battery module 22, and serves as an input/output terminal when the battery cell is charged or discharged. The terminal portions 68 of the plurality of the battery modules 22 are electrically connected in series or in parallel to each other by a bus bar (not shown).

As shown in FIG. 14, the battery module 22 includes a plurality of battery cells 2 placed in a zigzag array. In FIG. 14, a battery cell casing 3 (FIG. 15) which holds the plurality of battery cells 2 and which will be described later is not shown. The battery module 22 is formed by connecting a plurality of battery cells 2 in parallel such that a predetermined battery capacity is obtained. Here, an example configuration is shown in which 40 battery cells 2 are used is illustrated.

Figure 15:
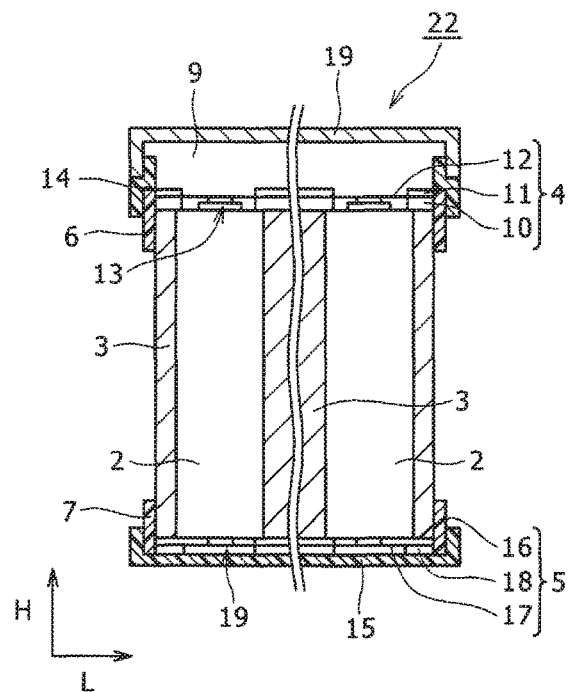
FIG. 15 is a C-C cross sectional diagram of FIG. 13 showing a device according to a preferred embodiment of the present invention.

As shown in FIG. 15, in the battery module 22, the 40 battery cells 2 are aligned and placed in a predetermined placement relationship with positive electrode sides aligned on one side and negative electrode sides aligned on the other side. The battery module 22 includes the battery cell 2, the battery cell casing 3, an upper holder 6, a lower holder 7, a module casing 8, and a module duct 19. The battery cell casing 3 houses and holds the battery cell 2, a positive electrode side electricity collecting portion 4 is placed on the positive electrode side, and a negative electrode side electricity collecting portion 5 is placed at the negative electrode side. The positive electrode side electricity collecting portion 4 and the negative electrode side electricity collecting portion 5 are combined to the battery cell casing 3 via the upper holder 6 and the lower holder 7. In a structure where the battery cell 2 exhausts from the negative electrode side, the battery module 22 may be aligned and placed with a predetermined placement relationship with the negative electrode sides of the battery cells 2 aligned on one side and the positive electrode sides aligned on the other side.

The battery cell 2 is a secondary battery which can be charged and discharged and which forms a minimum unit of the batteries forming the battery module 22. As the secondary battery, a lithium ion battery is used. Alternatively, a nickel metal hydride battery, an alkaline battery, or the like may be used. The 40 battery cells 2 included in the battery module 22 are placed with 20 battery cells being a group, and 2 groups placed side by side. A zigzag placement relationship which minimizes a gap between adjacent battery cells is employed for each group of battery cells 2, with 3 lines of batteries placed along the length direction L, respective battery lines having 7, 6, and 7 battery cells 2 along the width direction W.

The battery cell 2 has a cylindrical outer shape. Of the two ends of the cylindrical shape, one end is used as a positive electrode terminal and the other end is used as a negative electrode terminal. In the present embodiment, the positive electrode terminal is provided at an upper end of the battery cell 2 shown in FIG. 15, and the negative electrode terminal is provided at a lower end. The shape of the battery cell 2 is not limited to the cylindrical shape, and the battery cell 2 may have another outer shape.

The battery cell 2 has a safety valve 13 on the positive electrode terminal side. The safety valve 13 has a function to exhaust gas from the inside of the battery to the outside of the cell when a pressure of the gas generated by an electrochemical reaction taking place inside the battery cell 2 exceeds a predefined threshold pressure. The safety valve 13 may have a structure of a metal sheet which is broken when the gas pressure exceeds the threshold pressure or a structure having a valve member which separates from a valve seat when the gas pressure exceeds the threshold pressure.

The battery cell casing 3 is a holding container which holds the 40 battery cells 2 in an aligned placement of the predetermined placement relationship. The battery cell casing 3 is a frame member having the same height as the battery cell 2, and in which 40 through hole shaped battery housing portions are provided having both ends in the height direction H opened. Each battery cell 2 is housed and placed in one of the battery housing portions.

The placement of the battery housing portions is the zigzag placement relationship corresponding to the placement relationship of the battery cells 2. Specifically, two groups are placed side by side, 3 lines of battery housing portions are placed along the length direction L in each group, and respective battery storage section lines have 7, 6, and 7 battery housing portions, respectively, along the width direction W. As the battery cell casing 3, any material having superior thermal conductivity may be used. For example, there may be employed a structure having aluminum as a primary material and formed in a predetermined shape by extrusion.

In the battery cell casing 3, when the 40 battery cells 2 are housed and placed in the battery housing portions, the positive electrode sides of the battery cells 2 are aligned on one side and the negative electrode sides are aligned on the other side. In FIG. 15, the one side is the upper side on the page along the height direction H, and the other side is the lower side on the page along the height direction H. The battery cell casing may be formed from two groups of battery cell casing arranged side by side which are separated from each other, and each having 20 battery housing portions.

The positive electrode side electricity collecting portion 4 is a connection member placed to block the opening on one side of the battery cell casing 3, and electrically connecting the positive electrode sides of the aligned and placed battery cells 2. The positive electrode side electricity collecting portion 4 is formed from a positive electrode side insulating plate 10, a positive electrode plate 11, and a positive electrode lead plate 12.

The positive electrode side insulating plate 10 is a plate member placed between the battery cell casing 3, and the positive electrode plate 11 and the positive electrode lead plate 12, and electrically insulating between these members. On the positive electrode side insulating plate 10, there are provided 40 openings having a shape of a circle or the like, for allowing the positive electrode of each of the battery cells 2 to protrude therethrough. As the positive electrode side insulating plate 10, there is used a resin molded product or a structure in which a resin sheet is machined in a predetermined shape, having a predetermined heat endurance and electrical insulating property.

The positive electrode plate 11 is a thin plate having 40 electrode contact portions placed in a placement relationship to individually contact the positive electrodes of the battery cells 2. As the positive electrode plate 11, there may be used a metal thin plate having electrically conductive property and in which an electrode contact portion having a predetermined shape is formed around the periphery of which a cutout section having a C shape is formed is formed by etching or press machining or the like.

The positive electrode lead plate 12 is an electrode plate electrically connected to the positive electrode plate 11, and connecting the 40 electrode contact portions with each other, to format least one positive electrode side output terminal. As the positive electrode lead plate 12, there may be used a metal thin film having an electrically conductive property and a suitable thickness and strength. As the positive electrode lead plate 12, there may be used a structure in which the electrode contact portion of the predetermined shape with an opening having a shape of a circle or the like is formed by etching or press machining a metal thin plate.

The negative electrode side electricity collecting portion 5 is a connection member placed at the opening on the other side of the battery cell casing 3, and electrically connecting the negative electrode sides of the aligned and placed battery cells 2. The negative electrode side electricity collecting portion 5 is formed from a negative electrode side insulating plate 16, a negative electrode plate 17, and a negative electrode lead plate 18.

The negative electrode side insulating plate 16 is a plate member placed between the battery cell casing 3 and the negative electrode plate 17 and the negative electrode lead plate 18, and which electrically insulates between these members. 40 openings having a shape such as a circle for exposing the negative electrode of the battery cell 2 are provided in the negative electrode side insulting plate 16. As the negative electrode side insulating plate 16, there is used a resin molded product or a structure obtained by machining a resin sheet in a predetermined shape having a predetermined heat endurance and electrical insulating property.

The negative electrode plate 17 is an electrode member having 40 electrode contact portions placed in a positional relationship to individually contact respective negative electrode of the battery cells 2. As the negative electrode plate 17, there may be used a structure in which the electrode contact portion divided by forming a cutout of an approximate C shape by etching or press machining a metal thin plate having an electrically conductive property. Alternatively, a current disconnection element may be provided on the electrode contact portion of the negative electrode plate 17, which is melted and cut out when the temperature of the battery cell 2 exceeds a predefined threshold temperature by flow of an excessive current in the battery cell 2.

The negative electrode lead plate 18 is an electrode plate electrically connected to the negative electrode plate 17, and connecting 40 electrode contact portions to each other to form at least one negative electrode side output terminal. As the negative electrode lead plate 18, there may be used a structure in which an opening having a shape such as a circle corresponding to the electrode contact portion of the negative electrode plate 17 is formed by etching or press machining or the like in a metal thin plate having an electrical conductive property and having a suitable thickness and strength.

The upper holder 6 and the lower holder 7 are members for integrating as a whole the positive electrode side electricity collecting portion 4 placed on one side of the battery cell casing 3 and the negative electrode side electricity collecting portion 5 placed on the other side along with the battery cell casing 3, and is formed from an insulating material. For example, the upper holder 6 and the lower holder 7 are integrated by fastening the positive electrode side electricity collecting portion 4 and the negative electrode side electricity collecting portion 5 using a fastening member such as a bolt. Alternatively, the holders are not necessarily be formed as separate entities, and, for example, a side portion covering a side surface of the battery cell casing 3, an upper portion covering the positive electrode side, and a lower portion covering the negative electrode side may be integrally formed. The holders 6 and 7 are fixed at an inner side of the module casing 8, and the module casing 8 is formed from a duct cover 14 at an upper side and a bottom cover 15 at a lower side.

On an upper part of the battery module 22 having the above-described structure, there is provided the module duct 19 having a duct chamber 9 in the inside thereof and having a cross section of a U shape with the lower side opened. The module duct 19 is provided in a manner to cover the upper side of the upper holder 6, and is fixed on an upper side of a periphery of an upper end opening of the duct cover 14 having the upper end formed in a frame shape. On the other hand, on the lower side of the negative electrode side electricity collecting portion 5, the bottom cover 15 combined with the duct cover 14 is provided.

The duct chamber 9 faces the positive electrode terminal of the battery cell 2 in which the safety valve 13 is provided, with the opening or cutout portion therebetween, and is in communication with the exhaust port 52 (FIG. 13) formed on one end surface in the length direction of the module duct 19. With such a configuration, the gas blown out from the safety valve 13 of the battery cell 2 can be exhausted to the outside from the duct chamber 9 through the exhaust port 52. As will be described below, the exhaust port 52 is in communication with the corresponding first exhaust duct 51 or second exhaust duct 51A, and the gas blown out from each battery cell 2 is exhausted to the outside of the battery module 22 through the exhaust ducts 51 and 51A. The module duct 19 may be formed from any material having a superior thermal conductivity. For example, the module duct 19 is formed from a metal plate having aluminum as a primary material.

In the above, as the battery module 22, there is described a case in which the battery cells 2 are connected in parallel to each other, but alternatively, two groups of battery cells placed side by side and connected in series may be included, or three or more groups of battery cells which are connected in series or in parallel may be included.

Referring back to FIG. 12, the first exhaust duct 51 is connected to the battery module 22 at the uppermost level. In the following, a relationship between the battery module 22 at the uppermost level and the first exhaust duct 51 will be described, but the relationships between the battery modules 22 at the two middle levels including an upper level and a lower level and at the lowermost level and the second exhaust ducts 51A (FIG. 1) are similar, with the exception that the number of exhaust ports of the battery module 22 in communication with one second exhaust duct 51A is increased. The length of the second exhaust duct 51A is longer than the length of the first exhaust duct 51.

The battery module 22 is combined with the frame body 46. In the frame body 46, a rectangular first hole 70 is formed at a portion opposing the lower end of the battery module 22, and a plate portion of the rectangular shape at an inner side portion of the first hole 70 is bent at an approximate right angle toward the battery module 22 so as to form the first battery support plate 62. The second battery support plate 64 shown in FIG. 6 is formed to be longer than the first battery support plate 62 at a part opposing the lower end of the plurality of battery modules 22 at the middle levels and the lowermost level. On the battery support plates 62 and 64, the battery module 22 is placed on the upper side, and a support strength of the battery module 22 is increased. In addition, the terminal portion 68 of the battery module 22 extends to one side (front side of FIG. 8) of the frame body 46 through a second hole 72 formed in the frame body 46. Moreover, as shown in FIG. 13, on one end in the width direction (right end of FIG. 13) of at least one of the plurality of battery modules 22, a sensor unit 120 which contacts the battery cell casing 3 and detects the temperature thereof is detachably equipped on the module casing 8. This structure will be described later.

The first exhaust duct 51 is formed including a first duct body 74 having a rectangular cross section and a straight line shape, the duct exit member 76 and the lid member 78 connected respectively to the one end and the other end in the length direction of the first duct body 74, and the temperature reducing member 58 (FIG. 3) fixed on the duct exit member 76.

As shown in FIG. 12, the opening of the first duct body 74 on the side of the frame body 46 is in communication with the exhaust port 52 of the battery module 22 via a plate hole 84 (FIG. 6) formed in the frame body 46.

The duct exit member 76 includes the cross-section enlarging portion 54 having a shape in which a flow path cross sectional area SA for a plane orthogonal to the length direction is gradually enlarged toward the downstream side of the gas. The cross section of the cross-section enlarging portion 54 in a direction orthogonal to the length direction is rectangular. Specifically, the cross-section enlarging portion 54 is formed by connecting an upper surface P1 and a lower surface P2, an outer side surface P3 on a side opposite from the frame body 46, and an inner side surface P4 on the side of the frame body 46. The upper surface P1 and the lower surface P2 are inclined with respect to the horizontal plane, and the distance therebetween is increased toward the exit. The outer side surface P3 is inclined such that the surface is distanced away from the frame body 46 toward the exit. The inner side surface P4 has a shape approximately coincident with the side surface of the frame body 46. As a result, the flow path cross sectional area SA of the duct exit 56 which is the gas downstream end of the cross-section enlarging portion 54 is larger than a flow path cross sectional area SB of the first duct body 74 provided on the gas upstream side.

Alternatively, the cross-section enlarging portion 54 may have a shape, so long as there is no interference with the plate body, in which the inner side surface P4 is inclined with respect to planes along the height direction H and the length direction L such that the distance the outer side surface P3 is increased toward the exit, and the flow path cross sectional area SA is increased toward the gas downstream side.

As shown in FIG. 3, the temperature reduction member 58 is formed by a mesh shaped member made of a metal; that is, a wire net, fixed on the duct exit member 76. The temperature reduction member 58 is fixed at the periphery of the duct exit; for example, a portion where the flow path cross section is the largest, to block a part of the flow path at all times. The temperature reduction member 58 reduces the temperature of the gas by contact of the gas and the temperature reduction member 58 when gas of a high temperature passes through the gap of the mesh. Preferably, in a state where the temperature reduction member 58 is fixed at the periphery of the duct exit 56, a total area of the gap of the mesh is approximately the same as the flow path cross sectional area S2 of the duct body 74.

The lid member 78 is fixed to block the opening of the other end in the length direction of the first duct body 74. The duct exit member 76 and the lid member 78 may be formed from a resin.

The connection structures between the battery modules 22 at the two middle levels including the upper and lower levels and at the lowermost level and the second exhaust ducts 51A shown in FIGS. 1 and 3 are similar to the basic structure of the connection structure between the battery module 22 at the uppermost level and the first exhaust duct 51. In this case, exhaust ports provided in the plurality of battery modules 22 arranged along the length direction L at the respective levels are set in communication with the second exhaust ducts 51A of the two middle levels and the lowermost level. As shown in FIG. 1, the plurality of exhaust ducts 51 and 51A are placed in parallel to each other arranged in the up-and-down direction, and the duct exits of the exhaust ducts 51 and 51A are provided on one end in the length direction. Each duct exit opposes the exhaust gas blocking plate 66 folded and elevated at an approximate right angle on one end in the length direction of the frame body 46. In this case, there may be employed a configuration in which only a part of the opening ends of the duct exits opposes the exhaust gas blocking plate 66. With this configuration, as will be described below, the gas exhausted from each of the exhaust ducts 51 and 51A are blown onto the exhaust gas blocking plate 66, and the temperature of the gas is reduced.

Figure 16:
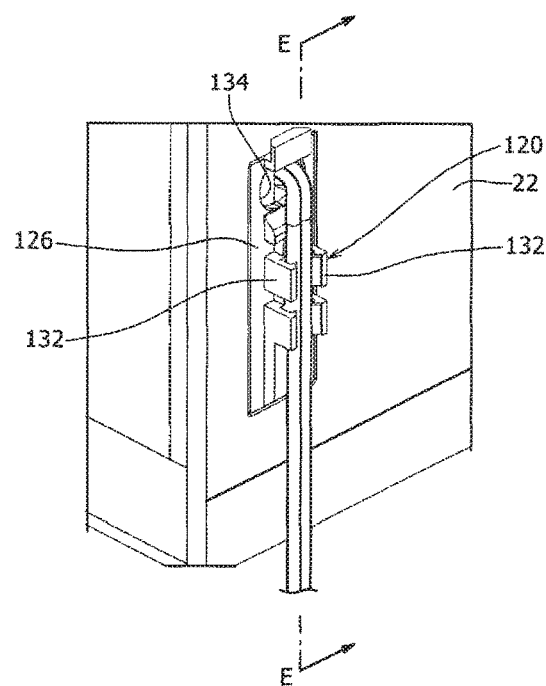
FIG. 16 is a D part enlargement view of FIG. 13 showing a device according to a preferred embodiment of the present invention.
Figure 17:
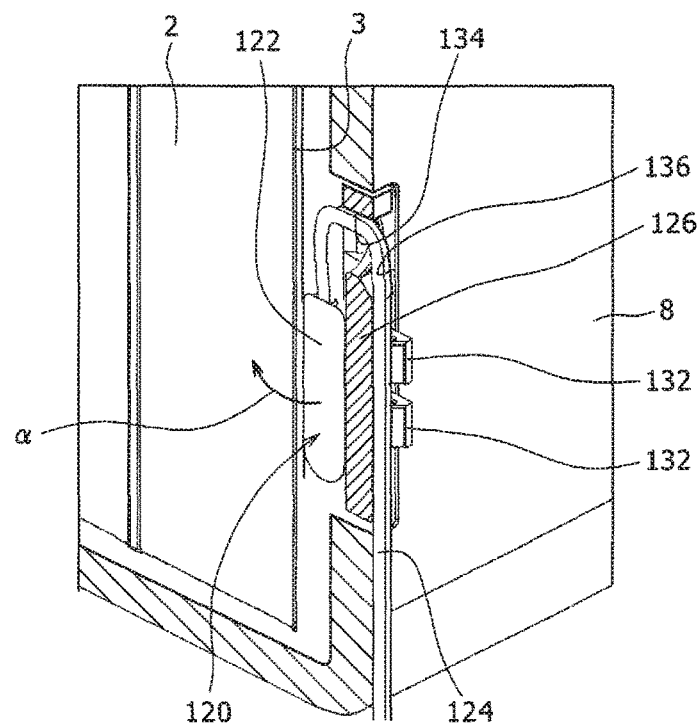
FIG. 17 is an E-E cross sectional diagram of FIG. 16 showing a device according to a preferred embodiment of the present invention.
Figure 18:
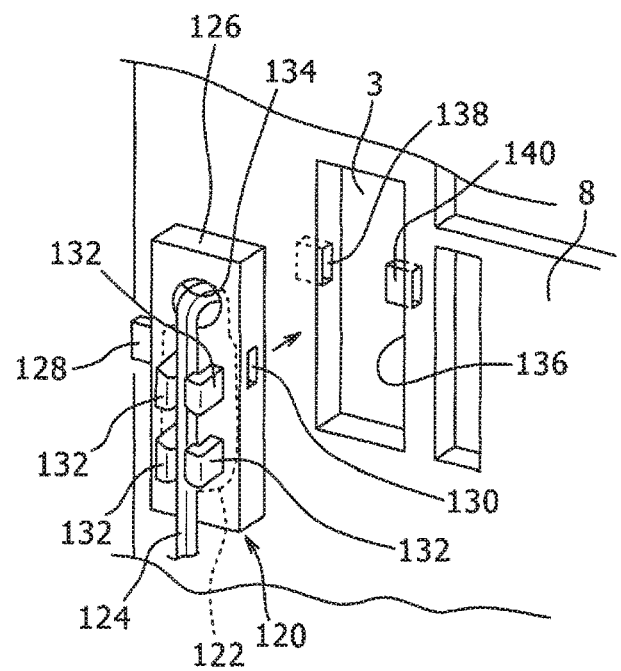
FIG. 18 is a perspective view showing a state immediately before a sensor unit is attached to a battery module in FIG. 16 in a device according to a preferred embodiment of the present invention.

Next, the sensor unit 120 will be described with reference to FIGS. 13 and 16-18. The sensor unit 120 is equipped on at least one of the plurality of battery modules 22 shown in FIG. 4; for example, two battery modules 22 at Q1 and Q2 positions of FIG. 4, for detecting the temperature. FIG. 16 is a D-part enlargement diagram of FIG. 13 showing the device of the preferred embodiment of the present invention. FIG. 17 is an E-E cross sectional diagram of FIG. 16 showing the device of the preferred embodiment of the present invention. FIG. 18 is a perspective view showing a state immediately before the sensor unit 120 is attached to the battery module 22 in FIG. 16 showing the device of the preferred embodiment of the present invention.

The sensor unit 120 includes a sensor body 122 having a thermistor, a cable 124 connected to the sensor body 122, and a holding member 126 which holds the sensor body 122. As shown in FIG. 18, the holding member 126 is formed in an approximate rectangular parallelepiped shape by a resin, a holding member side protrusion 128 is provided on one end, and a first holding member side hole 130 is provided on the other end. Further, locking arms 132 which form a pair by two locking arms, and which oppose each other are provided on an outer side surface (front side surface of FIG. 18) of the holding member 126. On an inner side surface of a tip of the locking arm 132, a recess groove is formed, and in each pair, the recess grooves oppose each other so that the cable 124 can be elastically held.

As shown in FIG. 17, on the inner side surface side (left surface side of FIG. 17) of the holding member 126, the sensor body 122 is placed, and the cable 124 connected to the sensor body 122 is bent and formed in a U shape against an elastic force. The cable 124 extends through a second holding member side hole 134 formed in the holding member 126 to the outer side surface (right surface side of FIG. 17) of the holding member 126, and is connected to the control circuit provided on the circuit board 30 (FIG. 1).

As shown in FIG. 18, on the module case 8, a rectangular hole 136 is formed to expose the battery cell casing 3, and a locking groove 138 and a casing side protrusion 140 are formed on the side surfaces of the rectangular hole 136 which oppose each other. When the sensor unit 120 is attached to the module casing 8, the holding member side protrusion 128 of the holding member 126 is inserted into the locking groove 138. In this state, the casing side protrusion 140 of the module casing 8 is elastically deformed, and, while the casing side protrusion 140 is slid to the holding member 126, the casing side protrusion 140 is engaged with the first holding member side hole 130, to insert and fix the holding member 126 to the rectangular hole 136. With this process, the sensor unit 120 is detachably equipped on the module casing 8. In this state, because the sensor body 122 is in contact with the outer surface of the battery cell casing 3, the temperature detection is enabled. Moreover, because the portion of the cable 124 formed in the U shape has an elastic force in a direction to return to the straight line shape, the sensor body 122 is elastically pressed onto the battery cell casing 3 in a direction of an arrow α of FIG. 17. Because of this, it is possible to prevent separation of the sensor body 122 and the battery cell casing 3, and to improve temperature detection precision. Further, by elastically adhering the sensor unit to the battery cell casing 3, it becomes possible to suppress reduction of the adhesion force due to change with elapse of time, and the high temperature detection precision can be maintained for a long period of time.

A detection signal of the sensor unit 120 is transmitted to the control circuit. The control circuit generates an alarm using a display or an alert section such as a buzzer or stops the operation of the electricity storage device 21 when the detected temperature exceeds a threshold temperature. Alternatively, two sensor units 120 may be equipped on, of the plurality of battery modules 22, a battery module 22 expected to have the highest temperature and another battery module 22 expected to have the lowest temperature. In this case, there may be employed a configuration in which, when a difference between the detected temperatures of the two battery modules 22 exceeds a threshold temperature, the control circuit executes one or both of the above-described generation of alarm or the above-described stopping of the operation of the electricity storage device 21.

According to the duct frame 20 described above, the first duct formation member 48 and the plurality of second duct formation members 50 are combined with the frame body 46 to form the first exhaust duct 51 and the plurality of the second exhaust ducts 51A. Because of this, unlike the structure in which the exhaust duct is formed independent from the frame body, the cost can be reduced with a structure including the plurality of duct structures. In addition, the rigidity of the fixation member 24 with the duct including the duct frame 20 can be improved.

In addition, even when the weight of the fixation member 24 with the duct is unbalanced to the sides of the duct formation members 48 and 50, falling of the fixation member 24 with the duct to the left side of FIG. 1 can be prevented by the fall prevention plate 60 provided at the lower end of the frame body 46. Moreover, because the fall prevention plate 60 is fixed to the casing 33 by the screw 112 inserted into the screw insertion hole 110, vibration of the fixation member 24 with the duct can be suppressed. In this manner, the duct frame 20 can have a plurality of useful functions.

According to the electricity storage device 21 described above, the corresponding first and second exhaust ducts 51 and 51A in communication with the exhaust port 52 of the battery module 22 have the cross-section enlarging portion 54 and the temperature reduction member 58 provided at the periphery of the duct exit on the gas downstream side of the cross-section enlarging portion 54. Because of this, the temperature of the gas blown out from the battery cell 2 and exhausted to the outside of the battery module 22 can be reduced and an increase of the gas pressure in the battery module 22 can be suppressed. Specifically, when the internal pressure is increased due to an abnormality of the battery cell included in the electricity storage device 21 and the safety valve 13 is activated, the gas of high temperature blown out from the safety valve 13 is sent to the first exhaust duct 51 through the inner side of the module duct 19 and the exhaust port 52. The gas flowing in a direction of an arrow β of FIG. 12 in the first exhaust duct 51 is exhausted to the outside of the battery module 22 through the cross-section enlarging portion 54. In this case, the temperature of the gas is reduced by heat discharge through the first exhaust duct 51 when the gas flows in the first exhaust duct 51, and is further reduced by passing through the gap of the temperature reduction member 58. Because of this, ignition by the exhaust gas can be prevented with a simple structure.

On the other hand, in a structure which has the temperature reduction member 58, but does not have the cross-section enlarging portion 54, there is a problem in that the pressure loss of the gas is increased because the periphery of the duct exit 56 of each of the exhaust ducts 51 and 51A is blocked by the temperature reduction member 58. In this case, the gas exhaust property from the inside of the battery module 22 is reduced. Because the electricity storage device 21 of the present embodiment has the cross-section enlarging portion 54 at the periphery of the duct exit 56, the gas temperature can be reduced by providing the temperature reduction member 58, and, at the same time, the increase in the pressure loss can be suppressed and the gas exhaust property from the battery module 22 can be improved.

In the above, a case is described in which a wire net is used as the temperature reduction member 58, but the temperature reduction member is not limited to a wire net. The temperature reduction member may be any structure which is fixed at the gas downstream side of the cross-section enlarging portion 54 in a manner to block a part of the gas downstream side at all times, and which can reduce the temperature of the gas passing through the gap. For example, one of a metal honeycomb shape member, a nonwoven fabric, and a fireproof fiber may be used as the temperature reduction member. The nonwoven fabric is more preferably formed from a fireproof material.

Moreover, as shown in FIGS. 1 and 2, at least a part of the duct exits 56 of the exhaust ducts 51 and 51A oppose the exhaust gas blocking plate 66. Because of this, the gas exhausted from the exhaust ducts 51 and 51A is blown onto the exhaust gas blocking plate 66 and the temperature thereof is reduced. Even when heat is conducted from the gas to the exhaust gas blocking plate 66, because the exhaust gas blocking plate 66 has a superior heat discharge property, the temperature thereof is maintained at a low temperature.

Because of this, even in case were a handle grabbed by a user or a manipulation unit is provided at a portion opposing the exits of the exhaust ducts 51 and 51A with the exhaust gas blocking plate 66 therebetween, for example, on a side wall or the like of the casing (not shown), an increase in the temperature of the handle or the manipulation unit can be suppressed.

Figure 19:
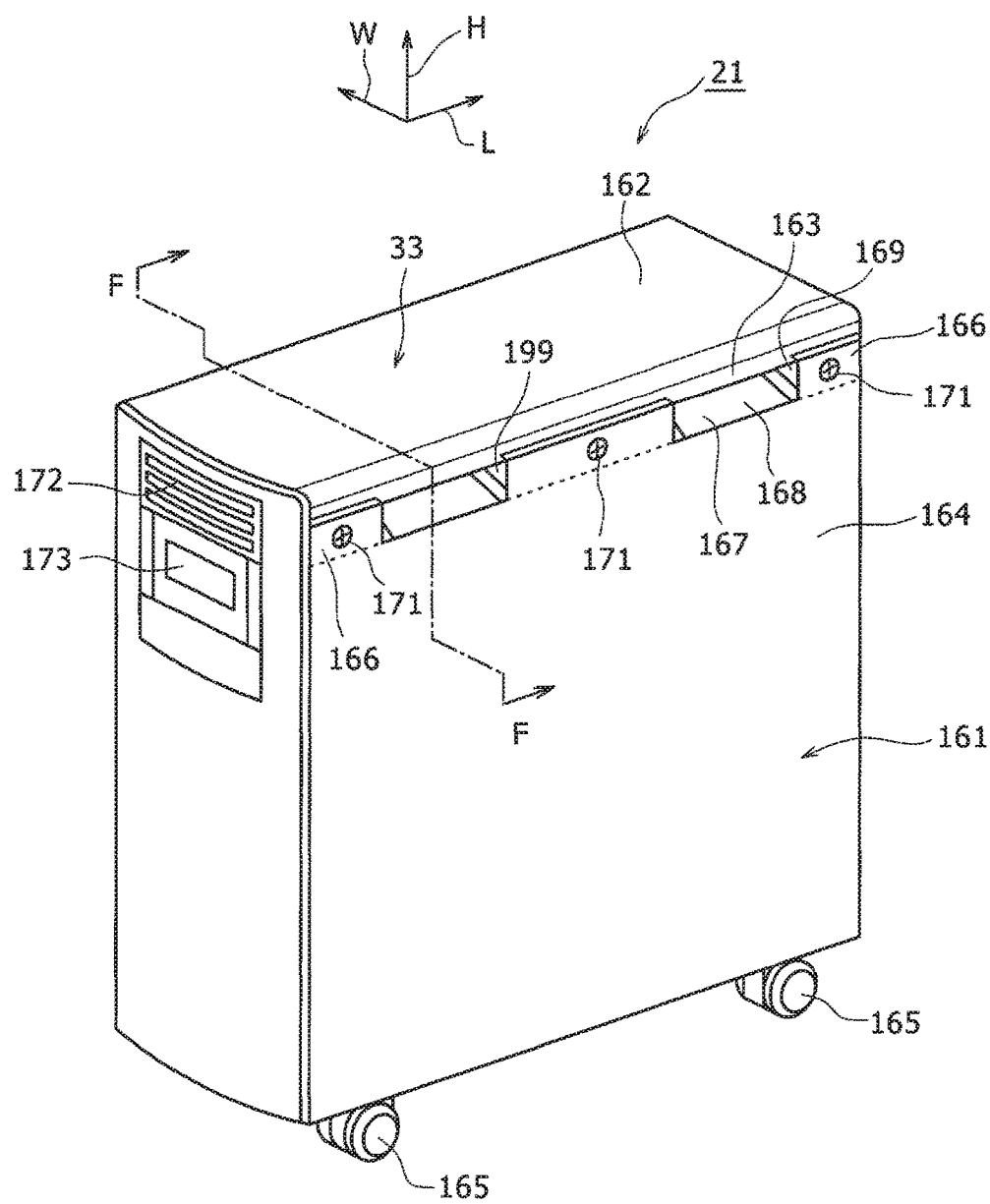
FIG. 19 is a perspective view of an electricity storage device of a first alternative configuration of a preferred embodiment of the present invention, viewed from outside of a casing.
Figure 20A:
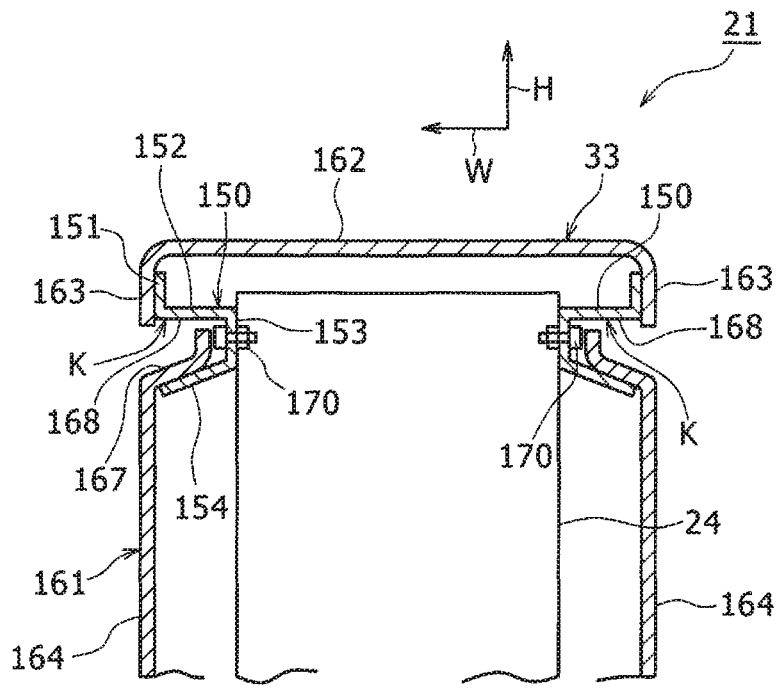
FIG. 20A is an F-F cross sectional diagram of FIG. 19 showing a device of the first alternative configuration of the preferred embodiment of the present invention.
Figure 20B:
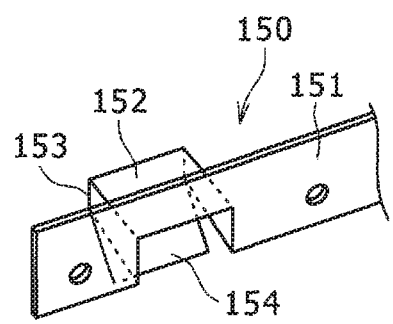
FIG. 20B is a perspective view partially showing a handle member shown in FIG. 20A in the first alternative configuration of the preferred embodiment of the present invention.

FIG. 19 is a perspective view of an electricity storage device 21 of a first alternative configuration of the preferred embodiment of the present invention, viewed from outside of a casing 33. FIG. 20A is an F-F cross sectional diagram of the first alternative configuration of the preferred embodiment of the present invention, and FIG. 20B is a perspective view partially showing a handle member 150 shown in FIG. 20A in the first alternative configuration of the preferred embodiment of the present invention.

The electricity storage device 21 includes the casing 33, and the fixation member 24 with the duct which is housed in the casing 33 and in which a plurality of battery modules 22 (FIG. 1) are fixed. In FIG. 20A, the fixation member 24 with the duct is schematically shown. The casing 33 has a casing body 161 formed in a box shape having an opening at an upper end, a lid portion 162 having a cross section of a U shape combined to block the opening at the upper end of the casing body 161, and two handle members 150 (FIGS. 20A and 20B). The casing body 161, the lid portion 162, and the handle members 150 are formed from, for example, a metal plate. The two handle members 150 are combined with a first wall 163 provided on both ends in the width direction W of the lid portion 162, and a second wall 164 provided on both ends in the width direction W of the casing body 161. At a lower end of the casing body 161, the casing body 161 is supported by caster wheels 165 at 4 locations on both ends in the width direction W and separated in the length direction L, so that the electricity storage device 21 can be moved by the user.

At an upper end edge of each of the second walls 164, 3 upper protrusions 166 protruding upward and distanced in the length direction L are formed. At the upper end edge of the second wall 164, an upper plate portion 167 inclined toward an inner side in the width direction (inner side of the casing 33) is formed between the upper protrusions 166. Each upper plate portion 167 forms a lower end of a handle portion 168 to be described later.

Each handle member 150 has a first handle side plate portion 151 along a vertical direction, second handle side plate portions 152 formed at 2 locations distanced in the length direction of the first handle side plate portion 151 and which extend in the width direction W toward the inner side of the casing 33, a third handle side plate portion 153 bent and formed downward from an end of the second handle side plate portion 152 and which extends downward, and a fourth handle side plate portion 154 inclined from a lower end of the third handle side plate portion 153 toward an outer side of the casing 33. The second handle side plate portion 152 is formed by bending and forming an inner side portion of an opening formed in a lower half portion toward the inner side of the casing 33 at 2 locations distanced in the length direction of the first handle side plate portion 151. The second handle side plate portion 152 forms an upper end of the handle portion 168. On both ends of the handle portion 168 in the length direction, a third wall 169 forming the casing body 161 is provided, and circulation of air between the inside space of the handle portion 168 and the inside of the casing 33 is blocked.

The third handle side plate portion 153 of each handle member 150 is fixed on the fixation member 24 with the duct by a fastening portion 170 including a bolt and a nut. With such a configuration, the handle member 150 is combined and fixed to the fixation member 24 with the duct without intervention of the casing body 161 in which the fixation member 24 with the duct which is a weight structure is mounted. The lid portion 162 is overlapped with the outer side in the width direction (outer side of the casing 33) of the first handle side plate portion 151 of each handle member 150 and attached on the upper side.

Each handle member 150 is fixed by a screw combining of the screw portion 171 in a state where the lower side portion of the first handle side plate portion 151 is overlapped on the inner side of the upper protrusion 166 of the casing body 161. In this state, the upper side plate portion 167 of the casing body 161 is placed at the upper side of the fourth handle side plate portion 154 of the handle member 150. The fourth handle side plate portion 154 and the upper side plate portion 167 may contact each other, or may be in non-contact with each other. Alternatively, one or both of the handle member 150 and the casing body 161 may be screw combined with the lid member 162.

When the user transports the electricity storage device 21, the user inserts his finger in the inner side of the handle portion 168, and lifts the lower surface of the second handle side plate portion 152 of the handle member 150 shown by an arrow K in FIG. 20A. Of the electricity storage devices 21, the fixation member 24 with the duct in which the battery module 22 is equipped may have a particularly large weight. Because of this, when the casing body 161 has a rigidity lower than that of the fixation member 24 with the duct, if the user lifts the fixation member 24 with the duct through the casing body 161, there is a possibility that the casing 33 is deformed. According to the structure of the present configuration, because the user can lift the fixation member 24 with the duct without the casing body 161 intervening therebetween, excess load is not applied to the casing 33 during the lifting, and deformation of the casing 33 can be prevented.

At an upper end of a right side surface of FIG. 19 which is a front side surface of the casing body 161, an intake duct 172 and a manipulation unit 173 including a liquid crystal unit are provided. At an upper end of a left side surface of FIG. 19 which is a rear side surface of the casing body 161, an exhaust duct (not shown) is provided. The casing 33 may have any structure having a handle member which is fixed to the fixation member 24 with the duct without a member which forms a lower part of the casing 33 and in which the fixation member 24 with the duct is placed (in the present configuration, the casing body 161) intervening therebetween. The handle member may have any structure with a shape that can be lifted by the user. The casing 33 is not limited to the structure shown in the drawings. For example, the handle portion is not limited to a structure to be provided at 4 locations of the casing 33, and one or three or more handle portions may be formed on each of the sides in the width direction W. The other structure and operation may be similar to those of the structure of FIGS. 1-18. Alternatively, each handle member 150 may have the first handle side plate portion 151 along the vertical direction, second handle side plate portions 152 formed at 2 locations distanced in the length direction of the first handle side plate portion 151 and which extend in the width direction W toward the inner side of the casing 33, and the third handle side plate portion 153 bent and formed upward from one end of the second handle side plate portion 152 and which extends upward.

Figure 21:
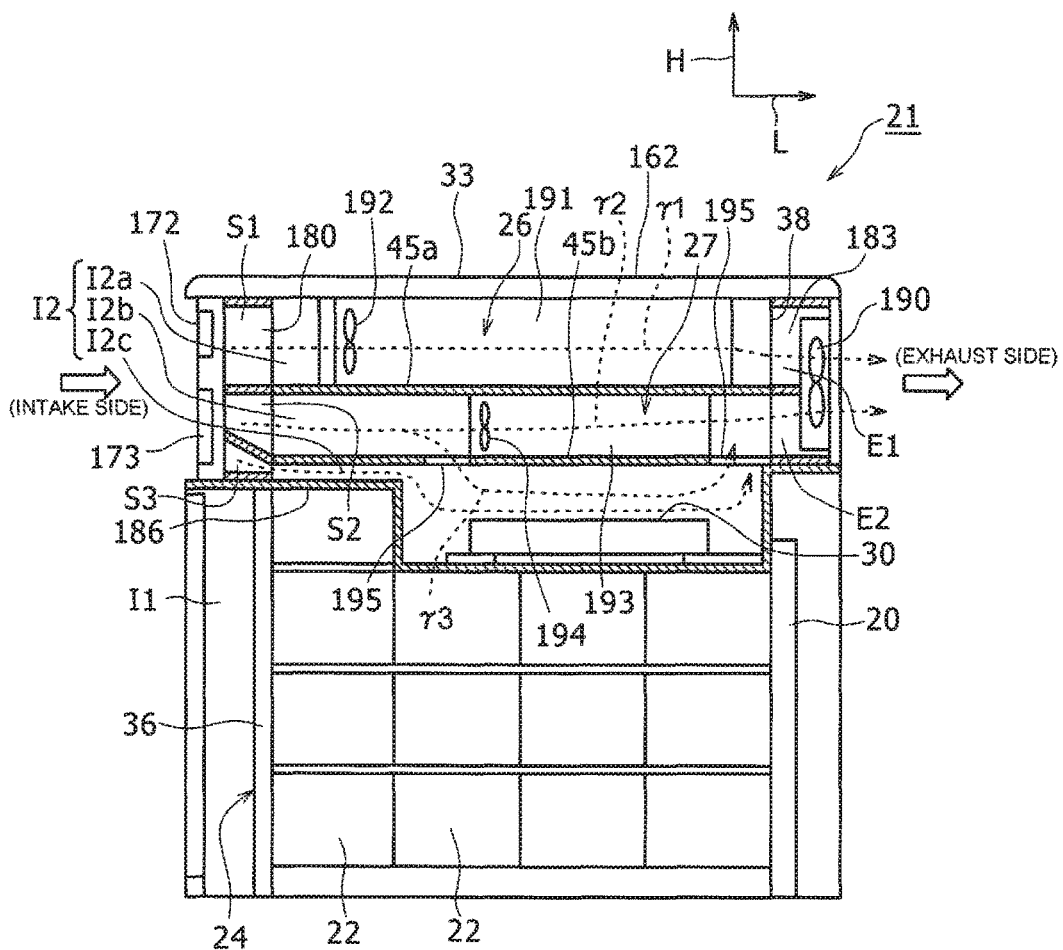
FIG. 21 is a diagram corresponding to FIG. 4, partially showing a cross section of an electricity storage device of a second alternative configuration of a preferred embodiment of the present invention.
Figure 22:
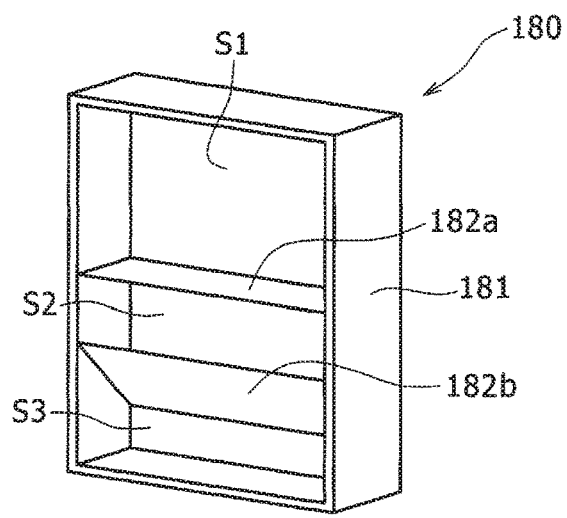
FIG. 22 is a perspective view showing an intake side flow regulation member shown in FIG. 21 of the device of the second alternative configuration of the preferred embodiment of the present invention.
Figure 23:
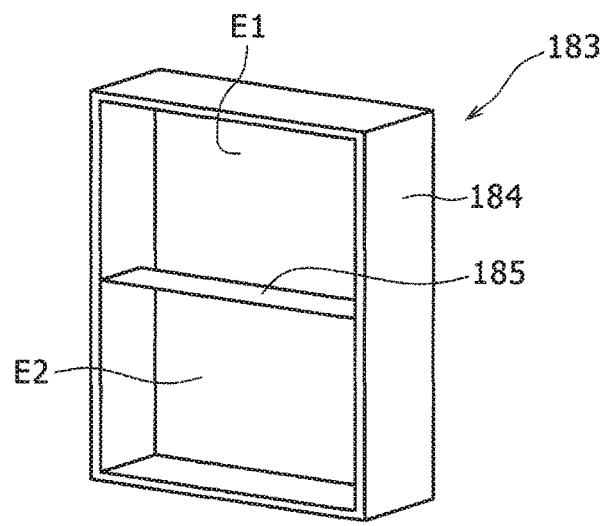
FIG. 23 is a perspective view showing an exhaust side flow regulation member shown in FIG. 21 of the device of the second alternative configuration of the preferred embodiment of the present invention.

FIG. 21 is a diagram corresponding to FIG. 4, showing an electricity storage device 21 of a second alternative configuration of the preferred embodiment of the present invention, showing a part of the device as a cross section. FIGS. 22 and 23 are perspective views of an intake side flow regulation member 180 and an exhaust side flow regulation member 183, respectively, of the second alternative configuration of the present embodiment shown in FIG. 21.

In the case of the electricity storage device 21 of the present configuration, the fixation member 24 with the duct is fixed to the first side frame 36, the second side frame 38, the duct frame 20 (FIG. 1), and the plurality of the combination frames 40, 42, 43, and 53 (FIGS. 5 and 7). The plurality of the combination frames 40, 42, 43, and 53 are the first combination frame 40, the second combination frame 42, the third combination frame 43, and the fourth combination frame 53. The fixation member 24 with the duct includes a separation plate 186 formed from a metal plate, the intake side flow regulation member 180 and the exhaust side flow regulation member 183, and a frame exhaust fan 190.

The separation plate 186 is formed by connecting a plurality of plate portions in horizontal and vertical directions, and is placed to separate the inside part of the fixation member 24 with the duct into a lower space I1 on the side of the battery module 22 and an upper space I2 in which the battery module 22 is not placed. In the casing 33 (refer to FIG. 19), the upper space I2 and the lower space I1 are not limited to the structures to completely block the circulation of air therebetween, and a structure may be employed in which the air circulates between the spaces through a narrow gap, for example, space between the casing 33 and the fixation member 24 with the duct. Alternatively, as in a third alternative configuration of the present embodiment to be described below with reference to FIG. 24, the exhaust exit of each of the exhaust ducts 51 and 51A connected to the battery module 22 may be in communication with the upper space I2 through an opening J (refer to FIGS. 2 and 3) around the upper end of the exhaust gas blocking plate 66. In the present configuration, similar to the structure of FIG. 24 to be described below, the exhaust exit of each of the exhaust ducts 51 and 51A is placed at the intake side of the casing 33.

The upper space I2 includes a first space I2a which is an upper space of an upper, first lateral plate 45a, a second space I2b which is an upper space of a lower, second lateral plate 45b, and a third space I2c which is a lower space of the second lateral plate 45b. The inverter 26 is placed in the first space I2a. The converter 27 is placed in the second space I2b. The circuit board 30 is placed in the third space I2c. Apart of the separation plate 186 is placed between the battery module 22 and the circuit board 30.

The inverter 26 includes an inverter body (not shown) placed in an inverter casing 191 and formed by a circuit board, and an inverter fan 192 placed in the inverter casing 191. The converter 28 includes a converter casing 193, a converter body (not shown) placed in the converter casing 193 and formed from a circuit board, and a converter fan 194 placed in the converter casing 193. In FIG. 21, the inverter fan 192 and the converter fan 194 are shown in a see-through manner. The inverter fan 192 and the converter fan 194 are controlled by a control circuit (not shown) included in the circuit board 30, and are switched between a drive state and drive stopped state according to a satisfaction state of predetermined conditions. On both ends of each of the casings 191 and 193 in the length direction L, there are formed aerial ports (not shown) for intake to the inside of the casings 191 and 193 and for exhaust from the inside of the casings 191 and 193.

In the second lateral plate 45b, a second plate opening 195 penetrating in the up-and-down direction is formed at a portion deviated to the outer side than the ends in the length direction of the converter 27.

As shown in FIG. 22, the intake side flow regulation member 180 has an intake side plate frame 181 having a rectangular cross section, and a first separation portion 182a and a second separation portion 182b which are two flat plate shaped separation portions combined on the inner side of the intake side plate frame 181. The upper, first separation portion 182a is placed in the horizontal direction, and the lower, second separation portion 182b is placed inclined with respect to the horizontal direction. An inside space of the intake side flow regulation member 180 is separated into three spaces including a first flow regulation space S1, a second flow regulation space S2, and a third flow regulation space S3 by the first separation portion 182a and the second separation portion 182b. The lower, second separation portion 182b is placed, in the up-and-down size of the third flow regulation space S3 at the lowermost part of the intake side flow regulation member 180, to have a larger size on the upstream side (front side of FIG. 22) of the flow of cooling air when the frame exhaust fan 190 to be described below is driven, and a smaller size on the downstream side (back side of FIG. 22).

As shown in FIG. 23, the exhaust side flow regulation member 183 includes an exhaust side plate frame 184 having a rectangular cross section, and an exhaust side separation portion 185 having a flat plate shape combined to an inner side of the exhaust side plate frame 184. An inside space of the exhaust side flow regulation member 183 is separated into a fourth flow regulation space E1 and a fifth flow regulation space E2 which are two up-and-down spaces, by the exhaust side separation portion 185.

The flow regulation members 180 and 183 are integrally molded from, for example, a resin. A locking projection (not shown) is formed on an outer circumferential surface of each of the flow regulation members 180 and 183. As shown in FIG. 21, the intake side flow regulation member 180 is fixed to the fixation member 24 with the duct by locking the locking projection in a locking hole (not shown) formed in the fixation member 24 with the duct on an end on the upstream side (left end of FIG. 21) of the cooling air. The exhaust side flow regulation member 183 is fixed to the fixation member 24 with the duct by locking the locking projection to a locking hole (not shown) formed in the fixation member 24 with the duct on an end on the downstream side (right end of FIG. 21) of the cooling air. In this state, the first flow regulation space S1 and the fourth flow regulation space E1 of the flow regulation members 180 and 183 are connected to both ends of the first space I2a. The second flow regulation space S2 of the intake side flow regulation member 180 and the fifth flow regulation space E2 of the exhaust side flow regulation member 183 are connected to both ends of the second space I2b. The third flow regulation space S3 of the intake side flow regulation member 180 is connected to an upstream end of the third space I2c. With the inclination of the separation portion 182b of the intake side flow regulation member 180, the outside air is easily introduced to a narrow, upstream side portion of the third space I2c. With the exhaust side separation portion 185 of the exhaust side flow regulation member 183, it is possible to prevent reverse flow, of the cooling air exhausted from the first space I2a and the second space I2b to the exhaust side flow regulation member 183, to another space I2b (or I2a).

The frame exhaust fan 190 is placed at downstream side of the inside of the exhaust side flow regulation member 183. Alternatively, the frame exhaust fan may be placed in each of the fourth flow regulation space E1 and the fifth flow regulation space E2 of the exhaust side flow regulation member 183. The frame exhaust fan 190 is controlled by a control circuit (not shown), and is switched between driving and drive stopped states according to a satisfaction state of predetermined conditions.

In the above-described structure, when the frame exhaust fan 190 is driven, outside air is introduced as cooling air into the inside of the casing 33 through the intake duct 172. The introduced cooling air is divided in the up-and-down direction by a flow dividing structure of the intake side flow regulation member 180 and flows. The cooling air flowing in the upper side passes through the inside of the inverter 26 as shown by an arrow γ1 of a broken line. The cooling air flowing in the lower side of the intake side flow regulation member 180 is divided into air passing through the inside of the converter 27 and air passing through the second plate opening 195 and around the circuit board 30 and flows, as shown by arrows γ2 and γ3 of broken lines.

The air flowing around the circuit board 30 passes through the second plate opening 195, is merged with the air passing through the converter 27, and is sent to the exhaust side flow regulation member 183. The cooling air sent to the exhaust side flow regulation member 183 is exhausted to the outside of the casing 33 through an exhaust duct (not shown).

According to the above-described structure, a large amount of cooling air is not introduced to the lower space I1 in which the battery module 22 is placed. Because of this, even when a structure having a high quietness property or a structure having a small size is used as the frame exhaust fan 190, the cooling air can be circulated to the upper space I2 in which the inverter 26, the converter 27, and the circuit board 30 are placed, with a large amount. Therefore, the inverter 26, the converter 27, and the circuit board 30 can be efficiently cooled. The placement order in the up-and-down direction of the inverter 26, the converter 27, and the circuit board 30 is not limited to the structure shown in the drawings, and various placement orders may be employed. Other structure and operation may be similar to those of the structure of FIGS. 1-18 or the structure of FIGS. 19 and 20.

Figure 24:
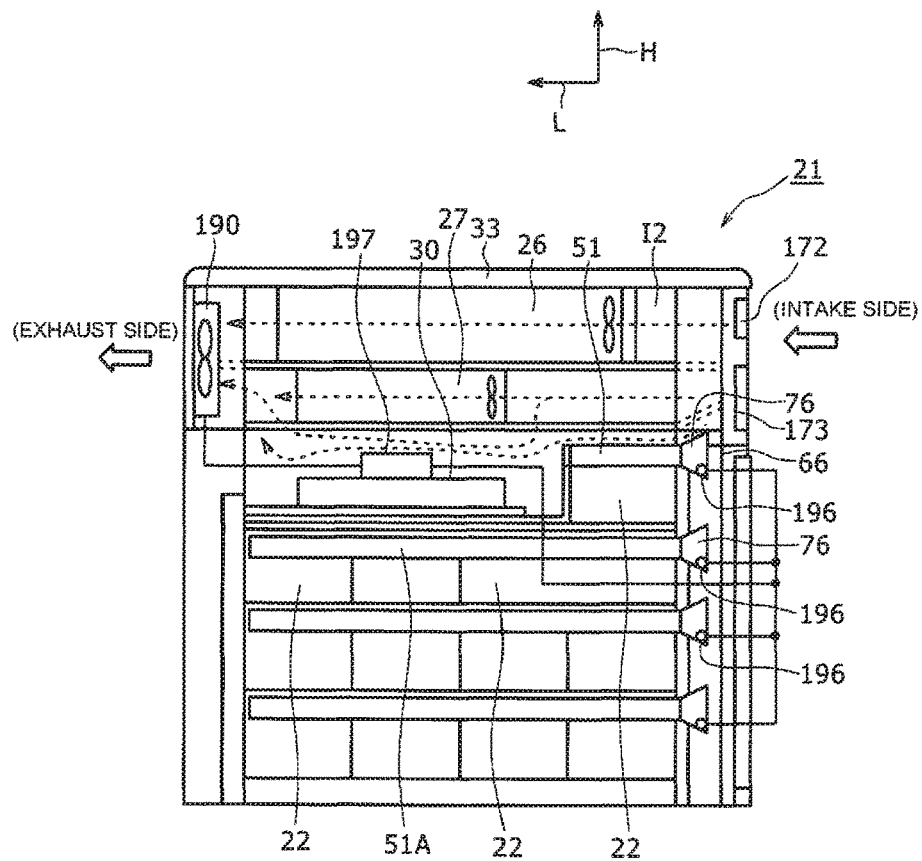
FIG. 24 is a diagram corresponding to a diagram viewed from a front side of FIG. 1, of an electricity storage device of a third alternative configuration of a preferred embodiment of the present invention.

FIG. 24 is a diagram of an electricity storage device 21 of a third alternative configuration of the preferred embodiment of the present invention, corresponding to a drawing viewed from a front side of FIG. 1.

The electricity storage device 21 of the present configuration includes a temperature sensor 196 attached to the duct exit member 76 of the exhaust ducts 51 and 51A connected to the battery modules 22. Each duct exit member 76 is provided at an exhaust side end of each of the exhaust ducts 51 and 51A. The temperature sensor 196 is, for example, a thermistor. A signal representing a detected temperature of each temperature sensor 196 is transmitted to a controller 197 including a control circuit provided on the circuit board 30. In FIG. 24, the controller 197 is schematically shown with a rectangle.

The exhaust exits of the exhaust ducts 51 and 51A connected to the battery modules 22 are placed at an intake side (right side of FIG. 24) end of the casing 33. The exhaust exits of the exhaust ducts 51 and 51A are in communication with the upper space I2 in which the inverter 26 and the converter 27 are placed, through the opening J at an upper side (refer to FIG. 3).

The controller 197 prohibits driving of the frame exhaust fan 190 when, of the detected temperatures of the plurality of the temperature sensors 196, a detected temperature of at least one temperature sensor 196 is greater than or equal to a predetermined value TA which is set in advance. The predetermined value TA is set based on a temperature which is reached when gas of high temperature is exhausted from the battery module 22 due to an abnormality of the battery cell of any of the battery modules 22.

Figure 25:
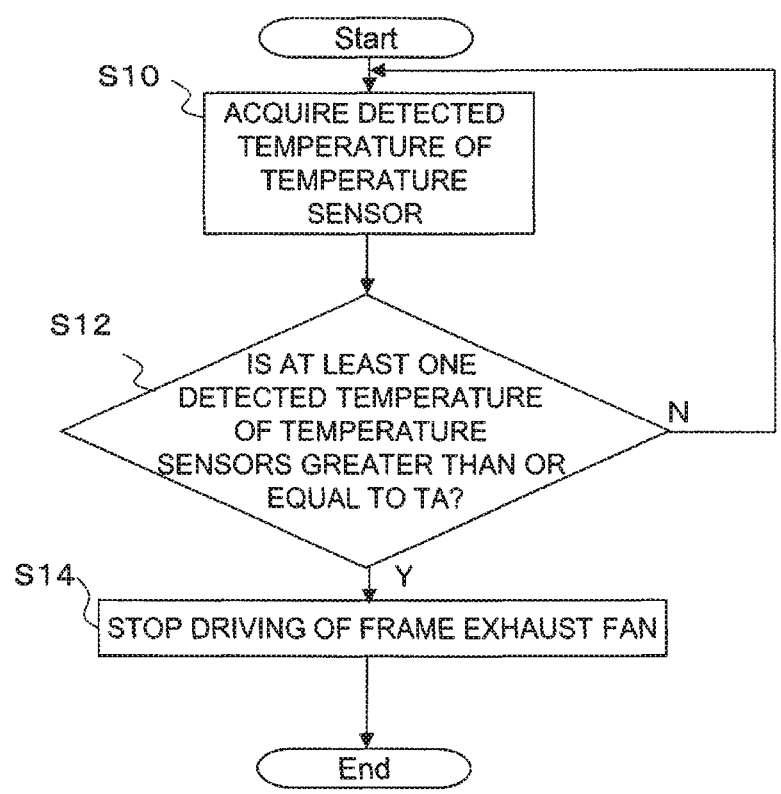
FIG. 25 is a flowchart showing a control method of a frame exhaust fan in the third alternative configuration of the preferred embodiment of the present invention.

FIG. 25 is a flowchart showing a control method of the frame exhaust fan 190 in the electricity storage device 21 of the third alternative configuration of the preferred embodiment of the present invention shown in FIG. 24. In step S10 (hereinafter, a step S will be simply referred to as "S"), the controller 197 acquires detected temperatures of the plurality of the temperature sensors 196, and in S12, determines whether or not the detected temperature of at least one temperature sensor 196 is greater than or equal to the predetermined value TA. When the determination result of S12 is positive, the controller 197 prohibits driving of the frame exhaust fan 190. In other words, the controller 197 stops the driving of the frame exhaust fan 190 if the frame exhaust fan 190 is being driven, maintains drive stopped state regardless of the other conditions when the frame exhaust fan 190 is in the stopped state, and completes the process. When the determination result of S12 is negative, the process returns to S10.

Alternatively, it is also possible to execute, as a step after S14, a step in which the controller 197 activates an alert portion (not shown) which generates an alarm sound, displays an alarm, or lights an alarm, to notify the user. For example, as the alert portion, there may be used the liquid crystal unit provided in the manipulation unit 173 (refer to FIG. 19), to display an alarm on the liquid crystal unit.

According to the above-described structure, when the detected temperature of the temperature sensor 196 becomes greater than or equal to the predetermined value TA, the driving of the frame exhaust fan 190 is prohibited. Because of this, when exhaust gas of high temperature is exhausted from the first exhaust duct 51 or the second exhaust duct 51A, it is possible to prevent vigorous exhaust of the exhaust gas to the outside of the casing 33. It is also possible to prevent vigorous passing of the high-temperature exhaust gas inside the inverter 26 and the converter 27, and to consequently prevent adverse effects on the constituting components of the inverter 26 and the converter 27. Alternatively, in place of the frame exhaust fan 190, it is also possible to provide a frame intake fan fixed on the fixation member 24 with the duct on the intake side end in the casing 33. In this case also, the controller 197 prohibits driving of the frame intake fan when, of the detected temperatures of the plurality of the temperature sensors 196, the detected temperature of at least one temperature sensor 196 is greater than or equal to the predetermined value TA which is set in advance. Other structure and operation may be similar to those of the structures of FIGS. 21-23.

Figure 26:
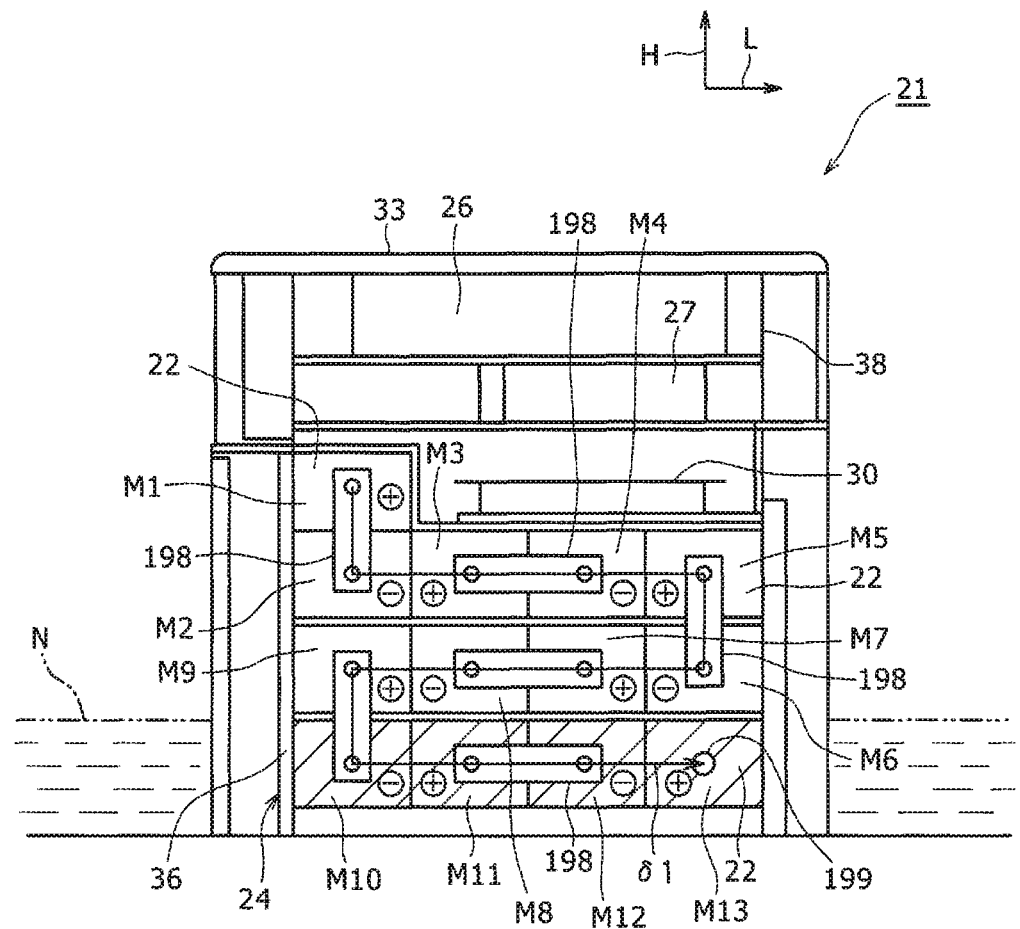
FIG. 26 is a diagram corresponding to FIG. 4, showing a bus bar connection state of a battery module in an electricity storage device of a fourth alternative configuration of a preferred embodiment of the present invention.
Figure 27:
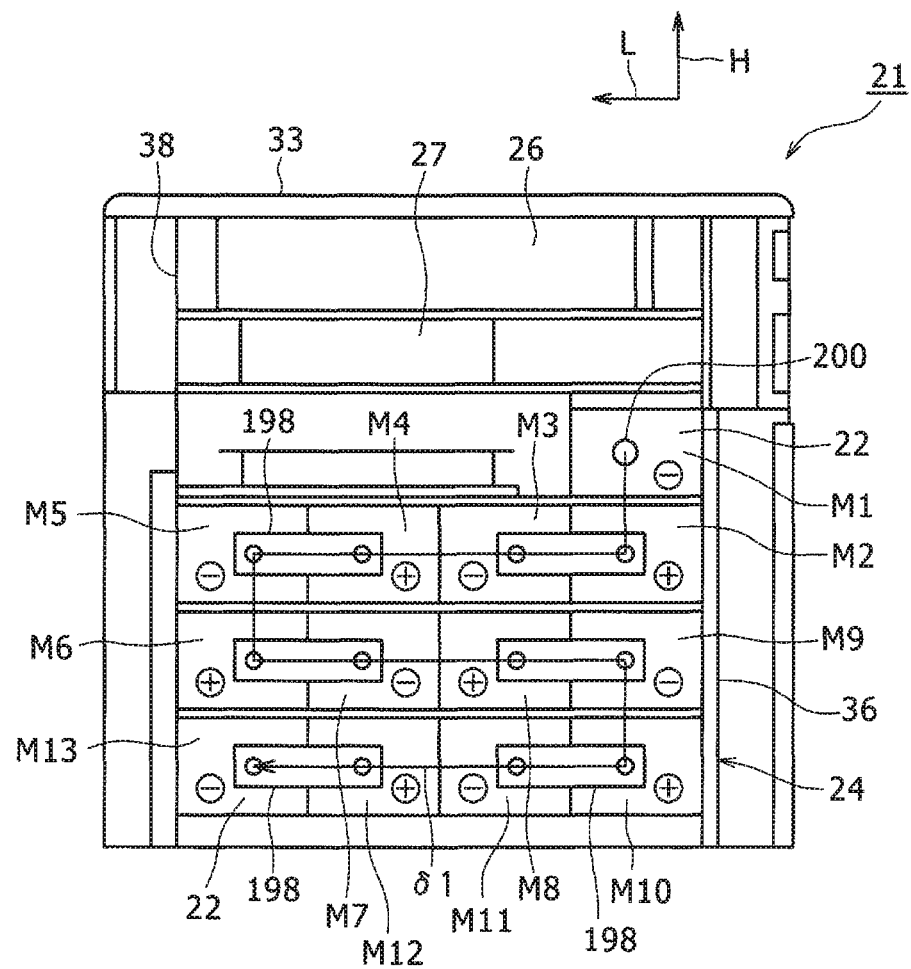
FIG. 27 is a diagram viewed from a back side of FIG. 26, of the device of the fourth alternative configuration of the preferred embodiment of the present invention.

FIG. 26 is a diagram showing an electricity storage device 21 of a fourth alternative configuration of the preferred embodiment of the present invention, which corresponds to FIG. 4 and showing a bus bar connection state of the battery module 22. FIG. 27 is a diagram of the fourth alternative configuration of the preferred embodiment of the present invention, viewed from a back side of FIG. 26. In the electricity storage device 21 of the present configuration, in the structure of FIGS. 1-18, the plurality of battery modules 22 are electrically connected in series by a plurality of bus bars 198. Of the plurality of the battery modules 22, a battery module 22 placed at a closest position to the positive electrode end is placed at one end in a length direction L of the lowermost level (right end of FIG. 26 and left end of FIG. 27).

On the other hand, of the plurality of the battery modules 22, a battery module 22 placed at a closest position to the negative electrode end is placed at the uppermost level. In the following description, the plurality of battery modules 22 may also be referred to with reference numerals M1, M2, . . . M13 in the order of placement from the negative electrode end toward the positive electrode end (this similarly applies to FIGS. 27 and 28). The battery module at the closest position to the positive electrode end (hereinafter referred to as "positive electrode end battery module") M13 has a collective positive electrode terminal 199, and the battery module at the closest position to the negative electrode terminal (hereinafter referred to as "negative electrode end battery module") M1 has a collective negative electrode terminal 200. The collective positive electrode terminal 199 and the collective negative electrode terminal 200 are connected to the circuit board 30.

The plurality of battery modules 22 are placed aligned in parallel in a plurality of levels arranged along the height direction H. The battery modules 22 on each level are connected in series from one end toward the other end in the length direction L which is the horizontal direction, and the battery modules 22 at the one end and the other end of adjacent levels are connected to each other in the up-and-down direction. With such a configuration, the plurality of battery modules 22 are connected in series in a serpentine manner. In this case, the adjacent battery modules 22 are connected by the bus bar 198 in the height direction H or the length direction L.

Specifically, the negative electrode end battery module M1 is connected to the battery module M2 on the other end in the length direction L and on a second level from the top, by the bus bar 198 in the up-and-down direction at the front side of FIG. 26, the battery modules M2, M3, M4, and M5 on the second level are connected from the other end toward the one end in the length direction L, alternatingly on the front side of FIG. 27 and the front side of FIG. 27, by the bus bars 198. Similarly, the battery modules M5 and M6 of the second level and the third level from the top are connected by the bus bar 198, the battery modules M6, M7, M8, and M9 on the third level are connected by the bus bars 198, and the battery modules M10, M11, M12, and M13 on the lowermost level are connected by the bus bars 198. FIGS. 26 and 27 show a flow of the current with an arrow 51.

According to the above-described configuration, even when the electricity storage device 21 is submerged in water to a certain height by flood or heavy rain, the battery modules 22 of the same level and having a small potential difference are short-circuited, and the danger of generation of a large spark can be reduced. For example, when the electricity storage device 21 is submerged into water to a position shown in FIG. 26 by two-dots-and-chain line N, there is a possibility that the battery modules M10, M11, M12, and M13 on the lowermost level shown with a slanted grid are short-circuited. In this case, as a case of the short-circuiting with the highest potential difference, two battery modules M10 and M13 may be short-circuited with a small potential difference corresponding to four battery modules. When the device is gradually submerged up to the third level or the second level from the top also, two battery modules 22 are similarly short-circuited with a small potential difference. When the submerging occurs, a metal having a high ionization tendency is eluted from the battery module 22 having the highest voltage, of the submerged battery modules 22. For example, there may be cases where an aluminum composition included in the electricity collecting plate inside the battery module 22 is eluted.

Figure 28:
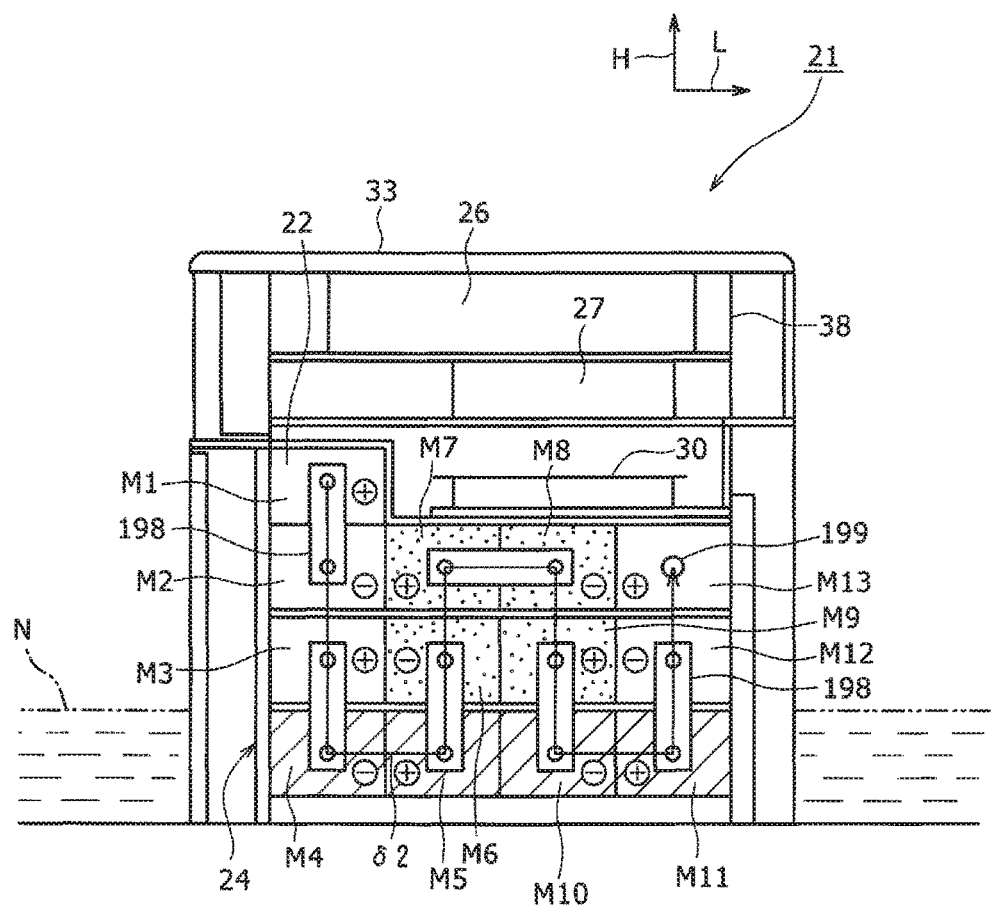
FIG. 28 is a diagram corresponding to FIG. 26, showing an electricity storage device of a Comparative Example.
Figure 29:
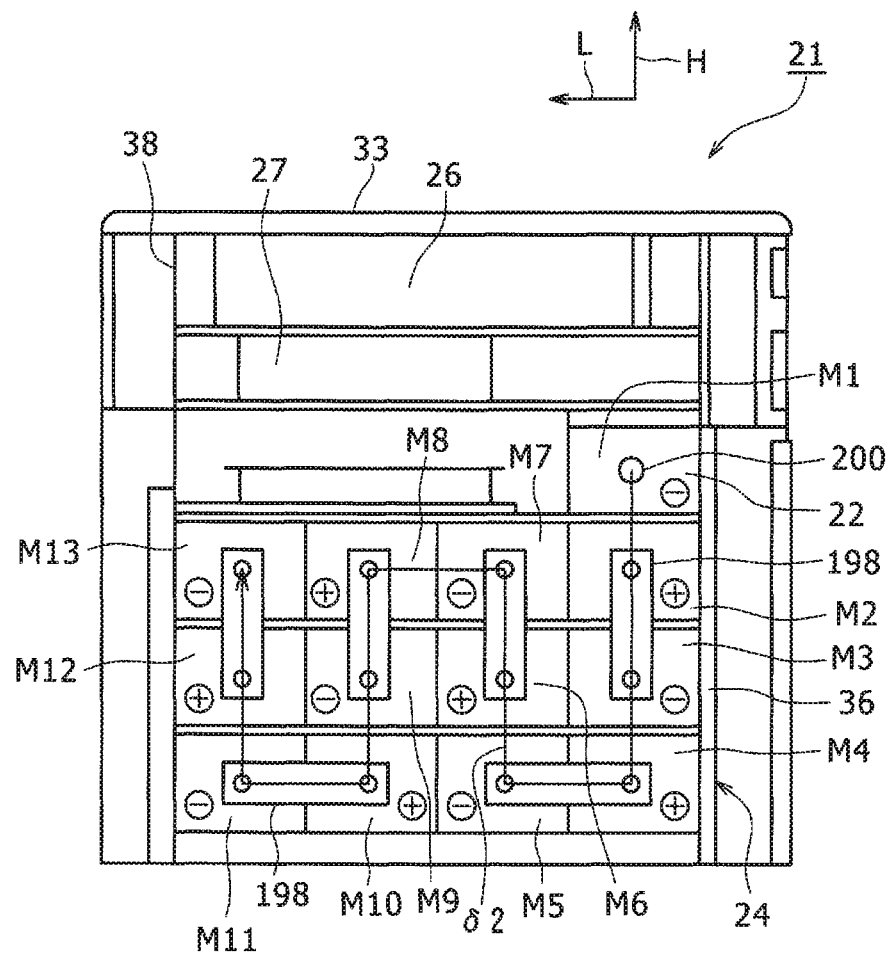
FIG. 29 is a diagram viewed from a back side of FIG. 28, of the electricity storage device of the Comparative Example.

FIG. 28 is a diagram showing the electricity storage device 21 of a Comparative Example and corresponding to FIG. 26. FIG. 29 is a diagram showing the electricity storage device 21 of the Comparative Example, viewed from a back side of FIG. 28. In the Comparative Example, the negative electrode end battery module M1 is placed at the uppermost level, but the positive electrode end battery module M13 is placed on one end in the length direction L on the second level from the top.

The plurality of battery modules 22 are placed aligned in parallel in a plurality of lines arranged along the length direction L which is the horizontal direction. The battery modules 22 of each line are connected in series from one end toward the other end in the height direction H, and the battery modules 22 on the one end and the other end of adjacent lines are connected to each other in the length direction L. With such a configuration, the plurality of battery modules 22 are connected in series while the overall structure extends in a serpentine manner. In this case, the plurality of battery modules 22 are connected by the bus bars 198 in the height direction H, or the length direction L. In FIGS. 28 and 29, the flow of the current is shown with an arrow 52.

In the above-described Comparative Example, for example, when the electricity storage device is submerged into water to a position shown by a two-dot-and-chain line N of FIG. 28, there is a possibility of short-circuiting for the battery modules M4, M5, M10, and M11 at the lowermost level shown with a slanted grid. In this case, as a case where short-circuiting occurs with the highest potential difference, there exists a case where two battery modules M4 and M11 are short-circuited with a potential difference corresponding to a total of 8 battery modules including the four battery modules M4, M5, M10, and M11 shown by the slanted grid, and the four battery modules M6, M7, M8, and M9 shown with a desert pattern. Because of this, in the Comparative Example, the risk of generation of spark by submerging in the water is higher compared to the present configuration. The present configuration can prevent such a disadvantage.

A preferred embodiment of the present invention has been described. The present invention, however, is not limited to the preferred embodiment, and various modifications can be made within the scope and spirit of the present invention. For example, the cross sectional shape of the duct bodies 74 and 75 included in the exhaust ducts 51 and 51A is not limited to the rectangular shape, and may alternatively be circular, elliptical, or polygonal other than rectangular. In addition, the exit of the exhaust duct is not limited to the structure having the cross-section enlarging portion, and the flow path cross sectional area may be set identical to each other over the entire length direction. In this case, the duct exit member 76 may be omitted. Alternatively, the lid member 78 may be omitted, to allow exhaust of the gas from both ends in the length direction of the exhaust duct.

In the electricity storage device 21 of FIG. 1, the duct frame may be provided not only on one side of the width direction W of the battery module 22, but also on the other side, and the exhaust duct on the other side may be connected to the battery module 22. Alternatively, a duct cover in which a protruding plate portion for regulating the gas flow is formed may be combined to the exit end of each exhaust duct. In addition, the battery fixation member may be any structure so long as the member has the duct frame 20, the first side frame 36 and the second side frame 38, and the combination frame for combining the first side frame 36 and the second side frame 38. The battery fixation member does not limit the number and placement positions of the combination frames.

EXPLANATION OF REFERENCE NUMERALS

2 BATTERY CELL; 3 BATTERY CELL CASING; 4 POSITIVE ELECTRODE SIDE ELECTRICITY COLLECTING PORTION; 5 NEGATIVE ELECTRODE SIDE ELECTRICITY COLLECTING PORTION; 6 UPPER HOLDER; 7 LOWER HOLDER; 8 MODULE CASING; 9 DUCT CHAMBER; 10 POSITIVE ELECTRODE SIDE INSULATING PLATE; 11 POSITIVE ELECTRODE PLATE; 12 POSITIVE ELECTRODE LEAD PLATE; 13 SAFETY VALVE; 14 DUCT COVER; 15 BOTTOM COVER; 16 NEGATIVE ELECTRODE SIDE INSULATING PLATE; 17 NEGATIVE ELECTRODE PLATE; 18 NEGATIVE ELECTRODE LEAD PLATE; 19 MODULE DUCT; 20 DUCT FRAME; 21 ELECTRICITY STORAGE DEVICE; 22 BATTERY MODULE; 24 FIXATION MEMBER WITH DUCT; 26 INVERTER; 27 CONVERTER; 30 CIRCUIT BOARD; 33 CASING; 36 FIRST SIDE FRAME; 38 SECOND SIDE FRAME; 40 FIRST COMBINATION FRAME; 42 SECOND COMBINATION FRAME; 43 THIRD COMBINATION FRAME; 44 BOARD SUPPORT FRAME; 45a FIRST LATERAL PLATE; 45b SECOND LATERAL PLATE; 46 FRAME BODY; 48 FIRST DUCT FORMATION MEMBER; 50 SECOND DUCT FORMATION MEMBER; 51 FIRST EXHAUST DUCT; 51A SECOND EXHAUST DUCT; 52 EXHAUST PORT; 53 FOURTH COMBINATION FRAME; 54 CROSS-SECTION ENLARGING PORTION; 56 DUCT EXIT; 58 TEMPERATURE REDUCTION MEMBER; 60 FALL PREVENTION PLATE; 62 FIRST BATTERY SUPPORT PLATE; 64 SECOND BATTERY SUPPORT PLATE; 66 EXHAUST GAS BLOCKING PLATE; 67 BOTTOM PLATE PORTION; 68 TERMINAL PORTION; 70 FIRST HOLE; 72 SECOND HOLE; 74 FIRST DUCT BODY; 75 SECOND DUCT BODY; 76 DUCT EXIT MEMBER; 78 LID MEMBER; 80 TEMPERATURE REDUCTION MEMBER; 84 PLATE HOLE; 110 SCREW INSERTION HOLE; 112 SCREW; 114 FIRST PROTRUSION; 116 SECOND PROTRUSION; 120 SENSOR UNIT; 122 SENSOR BODY; 124 CABLE; 126 HOLDING MEMBER; 128 HOLDING MEMBER SIDE PROTRUSION; 130 FIRST HOLDING MEMBER SIDE HOLE; 132 LOCKING ARM; 134 SECOND HOLDING MEMBER SIDE HOLE; 136 RECTANGULAR HOLE; 138 LOCKING GROOVE; 140 CASING SIDE PROTRUSION; 150 HANDLE MEMBER; 151 FIRST HANDLE SIDE PLATE PORTION; 152 SECOND HANDLE SIDE PLATE PORTION; 153 THIRD HANDLE SIDE PLATE PORTION; 154 FOURTH HANDLE SIDE PLATE PORTION; 161 CASING BODY; 162 LID PORTION; 163 FIRST WALL; 164 SECOND WALL; 165 CASTER WHEEL; 166 UPPER PROTRUSION; 167 UPPER PLATE PORTION; 168 HANDLE PORTION; 169 THIRD WALL; 170 FASTENING PORTION; 171 SCREW PORTION; 172 INTAKE DUCT; 173 MANIPULATION UNIT; 180 INTAKE SIDE FLOW REGULATION MEMBER; 181 INTAKE SIDE PLATE FRAME; 182a FIRST SEPARATION PORTION; 182b SECOND SEPARATION PORTION; 183 INTAKE SIDE FLOW REGULATION MEMBER; 184 EXHAUST SIDE PLATE FRAME; 185 EXHAUST SIDE SEPARATION PORTION; 186 SEPARATION PLATE; 190 FRAME EXHAUST FAN; 191 INVERTER CASING; 192 INVERTER FAN; 193 CON-

VERTER CASING; 194 CONVERTER FAN; 195 SECOND PLATE OPENING; 196 TEMPERATURE SENSOR; 197 CONTROLLER; 198 BUS BAR; 199 COLLECTIVE POSITIVE ELECTRODE TERMINAL; 200 COLLECTIVE NEGATIVE ELECTRODE TERMINAL.

The invention claimed is:

1. A battery fixation frame member, comprising:
a body plate portion; and
a plurality of duct formation members, wherein
each of the plurality of duct formation members has a straight line shape;
the plurality of duct formation members are fixed on a first surface side of the body plate portion such that a longitudinal direction of each of the duct formation members extends along the first surface of the body plate portion, and the plurality of duct formation members are combined with the body plate portion to form a plurality of exhaust ducts,
the body plate portion is formed of a metal plate, in which a plurality of battery support plates are formed in a protruding manner on a second surface side of the body plate portion, the plurality of battery support plates being where a plurality of battery modules are mounted;
the body plate portion comprises a plurality of holes for exhausting gas exhausted from inside of the plurality of battery modules;
in the plurality of exhaust ducts, the duct formation members comprise openings to communicate with the holes, the openings being formed in the plurality of duct formation members on a side of the duct formation members facing the body plate portion, and
the battery fixation frame member is used for forming a battery fixation member which integrally fixes a plurality of battery modules placed on the second surface side of the body plate portion.

2. The battery fixation frame member according to claim 1, further comprising a fall prevention plate that is provided in a horizontal direction on a lower end of the body plate portion and that prevents falling of the frame body.

3. The battery fixation frame member according to claim 2, further comprising a screw insertion hole formed in the fall prevention plate, and that fixes the fall prevention plate on a portion to be fixed placed at a lower part of the fall prevention plate, by a screw inserted to the screw insertion hole.

4. The battery fixation frame member according to claim 1, further comprising an exhaust gas blocking plate that is provided at an end of the body plate portion in a manner to oppose a downstream end of gas of each of the duct formation members.

5. A battery fixation member comprising:
the battery fixation frame member according to any one of claims 1 to 4 ;
two side frames combined to both ends of the battery fixation frame member and in a manner to have different placement directions with respect to the battery fixation frame member; and
a combination frame fixed in a manner to bridge over the two side frames.

6. An electricity storage device, comprising:
the battery fixation member according to claim 1; and
a plurality of battery modules, wherein
the plurality of battery modules are fixed on the battery fixation member and each has an exhaust port, and
each of the exhaust ducts is in communication with the exhaust port of at least one battery module of the plurality of the battery modules, and exhausts gas from the inside of the battery module.

* * * * *